(12) United States Patent
Odaka et al.

(10) Patent No.: US 7,230,364 B2
(45) Date of Patent: Jun. 12, 2007

(54) ELECTROSTATIC MOTOR UTILIZING STATIC ELECTRICITY AS A DRIVE FORCE

(75) Inventors: Shunichi Odaka, Yamanashi (JP); Isao Kariya, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 238 days.

(21) Appl. No.: 11/038,517

(22) Filed: Jan. 21, 2005

(65) Prior Publication Data
US 2005/0162038 A1    Jul. 28, 2005

(30) Foreign Application Priority Data
Jan. 23, 2004    (JP)    ............. 2004-015976

(51) Int. Cl.
*H02N 1/00*    (2006.01)
(52) U.S. Cl. .................................... 310/309
(58) Field of Classification Search ................ 310/309
See application file for complete search history.

(56) References Cited

U.S. PATENT DOCUMENTS

| | | | | |
|---|---|---|---|---|
| 4,754,185 | A * | 6/1988 | Gabriel et al. | 310/309 |
| 5,055,731 | A * | 10/1991 | Nihei et al. | 310/309 |
| 5,448,124 | A * | 9/1995 | Higuchi et al. | 310/309 |
| 5,541,465 | A * | 7/1996 | Higuchi et al. | 310/309 |
| 5,585,683 | A * | 12/1996 | Higuchi et al. | 310/309 |
| 5,708,319 | A * | 1/1998 | Ban et al. | 310/309 |
| 2005/0006980 | A1* | 1/2005 | Horst | 310/309 |
| 2005/0162036 | A1* | 7/2005 | Odaka et al. | 310/309 |
| 2005/0162037 | A1* | 7/2005 | Odaka et al. | 310/309 |
| 2005/0162038 | A1* | 7/2005 | Odaka et al. | 310/309 |
| 2005/0212382 | A1* | 9/2005 | Odaka et al. | 310/309 |

FOREIGN PATENT DOCUMENTS

| | | | |
|---|---|---|---|
| JP | 63095866 | * | 4/1988 |
| JP | 6-78566 | | 3/1994 |
| JP | 10155285 | * | 6/1998 |

OTHER PUBLICATIONS

Nino et al., "Electrostatic Artificial Muscle: Compact, High Power, Linear Actuators with Multiple Layer Structure", Workshop on Micromechanical Systems, Oiso Japan, Jan. 1994.*

Machine Translation of Suzuki, jp 10-155285. "electrostatic actuator".*

* cited by examiner

*Primary Examiner*—Karl Tamai
(74) *Attorney, Agent, or Firm*—Drinker Biddle & Reath LLP

(57) ABSTRACT

Stator and slider film electrodes (1, 2) are integrally provided with spacer members (10; 10'; 10'''; 15; 15'; 15''; 20). The spacer member is bonded to one end of a base film (4a) on which different phase electrode elements (3a, 3b, 3c) are disposed. After this, cover films (4b) are bonded to the two surfaces of the base film on which the spacer member is bonded to obtain a spacer-equipped film electrode.

11 Claims, 23 Drawing Sheets

EFFECTIVE DRIVE SURFACE

ELECTROSTATIC MOTOR UTILIZING STATIC ELECTRICITY AS A DRIVE FORCE

BACKGROUND OF THE INVENTION

1. Field of the Invention

The present invention relates to an electrostatic motor utilizing static electricity as a drive force.

2. Description of the Related Art

An electrostatic motor, as described in Japanese Unexamined Patent Publication No. 6-78566 etc., has a stator film electrode and a slider film electrode The stator film electrode and the slider film electrode have a multiphase AC power supply connected to them. The slider film electrode is made to slide relative to the stator film electrode.

A conventional electric motor using electromagnetic force requires a magnetic coil, permanent magnets, or other members for generating magnetic force and is difficult to make compact. However, an electrostatic motor does not require a magnetic coil, permanent magnets, or other large mass elements, so can be made ultrasmall and can be utilized as a source of drive power for micromachines etc.

FIG. 20 is a schematic perspective view of a linear electrostatic motor. A stator film electrode 1 has different phase electrode elements 3 formed by copper foil or other conductive strip-shaped thin films or thin wires etc. buried in an insulator 4. Similarly, a slider film electrode 2 has similar electrode elements 3 buried in an insulator 4. The stator film electrode 1 and the slider film electrode 2 have the different phase terminals connected to different phase outputs of a multiphase AC power supply and are made to generate a traveling wave field, which makes the slider film electrode 2 move linearly with respect to the stator film electrode 1. To make a linear electrostatic motor generate a larger force, the linear electrostatic motor may be constructed by stacking a plurality of sets of stator film electrodes 1 and slider film electrodes 2.

In the case of a rotary electrostatic motor, as shown by the schematic perspective view of FIG. 21, a stator film electrode 1 has different phase electrode elements 3 formed by conductive strip-shaped thin films or thin wires etc. buried in a radial array in an insulator 4. Similarly, a slider film electrode 2 also has different phase electrode elements 3 buried in a radial array in an insulator 4. This rotary electrostatic motor differs from the linear electrostatic motor shown in FIG. 20 only in the point that the different phase electrode elements 3 are arranged radially. The rest of the configuration is the same as that of the linear electrostatic motor. Corresponding elements are assigned the same reference numerals. In this rotary electrostatic motor as well, the stator film electrode 1 and the slider film electrode 2 are connected to a multiphase AC power supply and are made to generate a traveling wave field, which makes the slider rotate relative to the stator.

In the case of this rotary electrostatic motor as well, to generate a larger force, the rotary electrostatic motor may be constructed by stacking a plurality of sets of stator film electrodes 1 and slider film electrodes 2 and connecting the stator film electrodes 1 and the slider film electrodes 2 with each other.

FIGS. 22A to 22C are views for explaining the film electrodes forming the stator and slider film electrodes 1, 2. FIG. 22A is a view of one surface (front surface) of a film electrode 1 or 2 as seen head-on, while FIG. 22B is a view of the other surface (back surface) as seen head-on. These show the electrode elements and the patterns of the power feed paths for feeding power to the electrode elements. The electrode elements and power feed paths shown by the solid lines are positioned at the viewed sides, while the electrode elements and power feed paths shown by the broken lines are positioned at the opposite sides.

Further, FIG. 22C is a sectional view taken along the line A–A' of FIG. 22A. Each of the stator and slider film electrodes 1, 2 has different phase electrode elements 3 formed by conductive strip-shaped thin films or thin wires etc. buried in an insulator 4. FIGS. 22A to 22C show as an example a film electrode 1 or 2 driven by a three-phase AC power supply. The film electrode 1 or 2 is provided with plated through hole conductive parts 6a, 6b, 6c connected to the first, second, and third phase outputs of the three-phase AC power supply. The through hole conductive part 6a connected to the first phase output is connected through the power feed path 5a to the first phase electrode elements 3a, 3a . . . , while similarly the through hole conductive part 6b connected to the second phase output is connected through the power feed path 5b to the second phase electrode elements 3b, 3b . . . and the through hole conductive part 6c connected to the third phase output is connected through the power feed path 5c to the third phase electrode elements 3c, 3c. . . The second phase power feed path 5b is arranged at the opposite side (back surface) from the side where the other phase power feed paths 5a, 5c and the electrode elements 3a to 3c are provided and is connected with the second phase electrode elements 5b, 3b through the through hole conductive parts 7, in order to prevent its intersecting with and contacting the other phase power feed paths 5a, 5c.

As shown in FIG. 22C as a cross-sectional view taken along the line A–A', two insulator films forming base films 4a are bonded back-to-back with each other. A conductor layer is bonded to one of the base films 4a and etched to form a pattern of the conductor of the power feed path 5b on the base film 4a. Another conductor layer is also bonded to the other of the base films 4a and etched to form patterns of the conductors of the electrode elements 3a, 3b, 3c and the power feed paths 5a, 5c on the other base film 4a. The outsides are covered by cover films 4b which form insulating layers. That is, the film electrode 1 or 2 is formed by a layer of the cover film 4b, a layer of the power feed path 5a and an adhesive, a layer of one base film 4a, a layer of an adhesive, a layer of the other base film 4a, a layer of the electrode elements 3a, 3b, 3c, the power feed paths 5a and 5c and the adhesive, and a layer of the cover film 4b.

Power is fed through the different phase through hole conductive parts 6a, 6b, 6c connected to the different phase outputs of the multiphase AC power supply (in the example shown in the drawings, a three-phase AC power supply) to the stator film electrode 1 and the slider film electrode 2 to generate a traveling wave field, which causes the slider film electrode 2 to slide with respect to the stator film electrode 1.

FIG. 23 to FIG. 28 are views for explaining an assembly process and stacking process of such a stator film electrode 1 or slider film electrode 2.

First, as shown in FIG. 23, a base film 4a is formed with through holes, then the through holes are plated to form conductive parts 6a' to 6c' and 7 for connecting the different phase electrode elements 3a to 3c and the AC power supply with each other. The strip-shaped thin films comprised of copper foil or another electric conductor at the two sides of the base film 4a are etched etc. to form patterns for forming the electrode elements 3 (3a to 3c) and the power feed paths 5a to 5c. Next, cover films 4b, 4b are bonded by an adhesive to the two surfaces of the base film 4a, on which the electrode elements 3 etc. are provided, thereby forming a stator or slider film electrode 1 or 2. Note that the cover films 4b, 4b are formed with through hole conductive parts 6a''', 6b41, 6c''' facing the through hole conductive parts 6a, 6b, 6c for connecting to the power supply.

Next, as shown in FIG. 24 and FIG. 25, spacer members 10 are arranged at the ends of the stator film electrode 1 and the slider film electrode 2 (see FIG. 25 and FIG. 26) and the effective drive surfaces of the stator film electrode 1 and the slider film electrode 2 on which the electrode elements 3 are arranged in parallel are arranged to face each other (FIG. 27) so that the through hole conductive parts 6a to 6c (conductive parts formed by the conductive parts 6a' to 6c' and 6a''', 6b''', 6c''') of the stator film electrode 1 and the slider film electrode 2 and through holes 10a, 10b, 10c provided at the spacer members 10 are aligned with each other. Thus, an electrostatic motor is formed by a set of a stator film electrode 1 and a slider film electrode 2.

Further, when stacking a plurality of sets of stator film electrodes 1 and slider film electrodes 2, as shown in FIG. 28A, the sets of the stator film electrodes 1 and slider film electrodes 2 are positioned and successively stacked (FIGS. 28A and 28B show the example of providing two sets of stator film electrodes 1 and slider film electrodes 2 for forming a single unit of an electrostatic motor) and conductive pins 11 (11a to 11c) are inserted through the through hole conductive parts 6a to 6c for connecting to the power supply. Conductive pins 11 (11a to 11c) of the stator film electrodes 1 are connected to the stator AC power supply, while conductive pins 11 (11a to 11c) of the slider film electrodes 2 are connected to the slider AC power supply, whereby power is supplied through the conductive pins 11, the conductors of the through hole conductive parts 6a to 6c, the power feed paths 5a to 5c, and the power feed through hole conductive parts 7 to the different phase electrode elements 3a to 3c of the stator film electrodes 1 and slider film electrodes 2.

FIG. 28B shows an embodiment in which instead of the conductive pins 11, conductive rubber or conductive metal spring or other connection parts 12 are used to feed power to the electrode elements 3 of the stacked stator film electrodes 1 and the slider film electrodes 2. These connection parts are inserted in the through hole conductive parts 10a, 10b, 10c of the spacer members 10 and made to abut against or engage with the through hole conductive parts 6a to 6c of the stator film electrodes 1 and the slider film electrodes 2 at their tips.

After plurality of stator film electrodes 1 and slider film electrodes 2 are stacked in this way, the stator film electrodes 1 are fastened to a stator housing and the slider film electrodes 2 are fastened to a slider housing. Thus, a plurality of unit electrostatic motors are stacked to obtain an electrostatic motor comprised of multiple units.

Note that in FIGS. 23, 24, and 26, for convenience in illustration, the cover films 4b are illustrated as if they were transparent members.

In the above conventional electrostatic motor, the stator film electrode 1, the slider film electrode 2, and the spacer members 10 are arranged at predetermined positions to form a set, a plurality of such sets of stator film electrodes 1, slider film electrodes 2, and spacer members 10 are stacked, conductive pins 11 or connection parts 12 are used to electrically connect the stator film electrodes 1 and the slider film electrodes 2, and the stator film electrodes 1 and slider film electrodes 2 are fastened to housings.

However, the stator and slider film electrodes 1, 2, as explained above, are mainly formed by base films 4a and cover films 4b and therefore are extremely thin (thicknesses of tens of micrometers), so if even a slight force acts on the film electrodes 1, 2, they will end up changing in positions and orientations. This makes it extremely difficult to align and assemble the stator and slider film electrodes 1, 2 and the spacer members 10 all at once.

SUMMARY OF THE INVENTION

An object of the present invention is to solve the above assembly problems and provide an easy-to-assemble electrostatic motor.

The present invention provides an electrostatic motor, which includes stator and slider film electrodes stacked with a gap, each having a base film on which electrode elements are provided and cover films, wherein each of the film electrodes is integrally provided with a step for securing the gap.

In one embodiment, each of the film electrodes provided with the steps is formed by bonding a spacer member to the base film and covering the bonded base film and spacer member by the cover films. In this case, the spacer member is preferably provided with means for transmitting power in a thickness direction and is more preferably further provided with means for transmitting power in a direction other than the thickness direction.

Further, each of the film electrodes provided with the steps may be formed by integrally forming the base film and the step or may be formed by integrally forming the step and one of the cover films.

Further, in another embodiment, each of the film electrodes provided with the steps is formed by bonding a spacer member to the film electrode. In this case, the spacer member is preferably provided with means for transmitting power in a thickness direction and is more preferably further provided with means for transmitting power in a direction other than the thickness direction.

Further, each of the film electrodes provided with the steps may be formed by riveting or screwing a spacer member for forming the step to the base film having the electrode elements provided thereon and covering the base film and the spacer member by the cover films. Alternatively, each of the film electrodes provided with the steps may be formed by riveting or screwing a spacer member to the film electrode.

By stacking a plurality of electrostatic motor units each formed by stacking, with a gap, the stator film electrode provided with the step and the slider film electrode provided with the step, it is possible to obtain a more powerful electrostatic motor.

In the present invention, since parts of the stator and slider film electrodes are formed with thick parts forming step differences, even if the film electrodes are subjected to a slight force, they will not change in position and orientation. Further, at the time of assembly, there are fewer members to be aligned, so assembly becomes easier.

BRIEF DESCRIPTION OF THE DRAWINGS

These and other objects, features and advantages of the present invention will be described in more detail below based on the preferred embodiments of the present invention with reference to the accompanying drawings, wherein.

DETAILED DESCRIPTION

Preferred embodiments of the present invention will be described in detail below with reference to the accompanying drawings.

Figure 20:
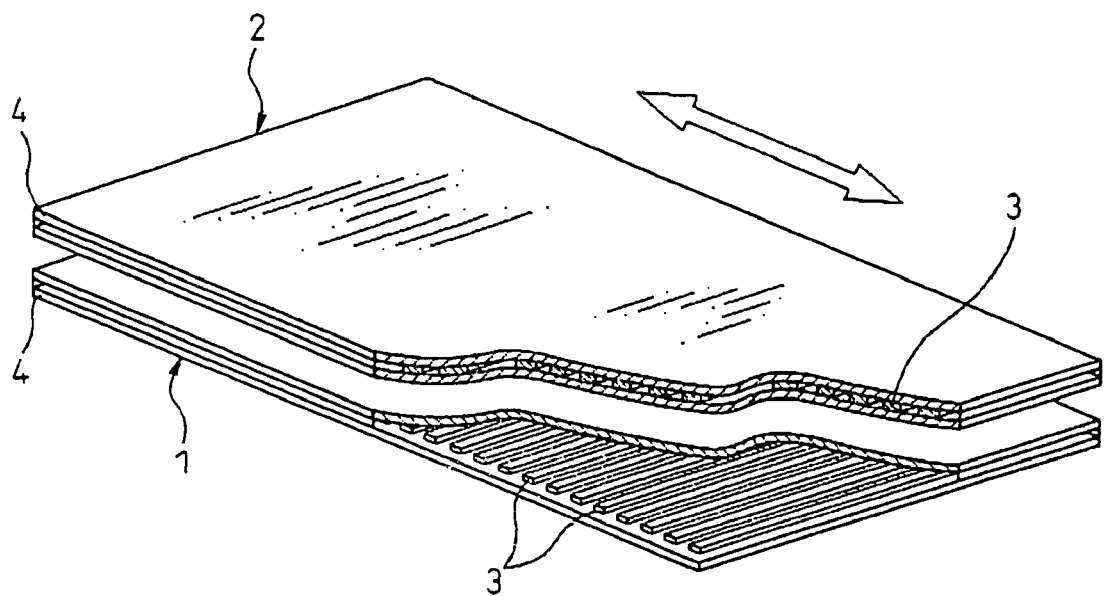
FIG. 20 is a schematic perspective view of a conventional linear electrostatic motor.
Figure 21:
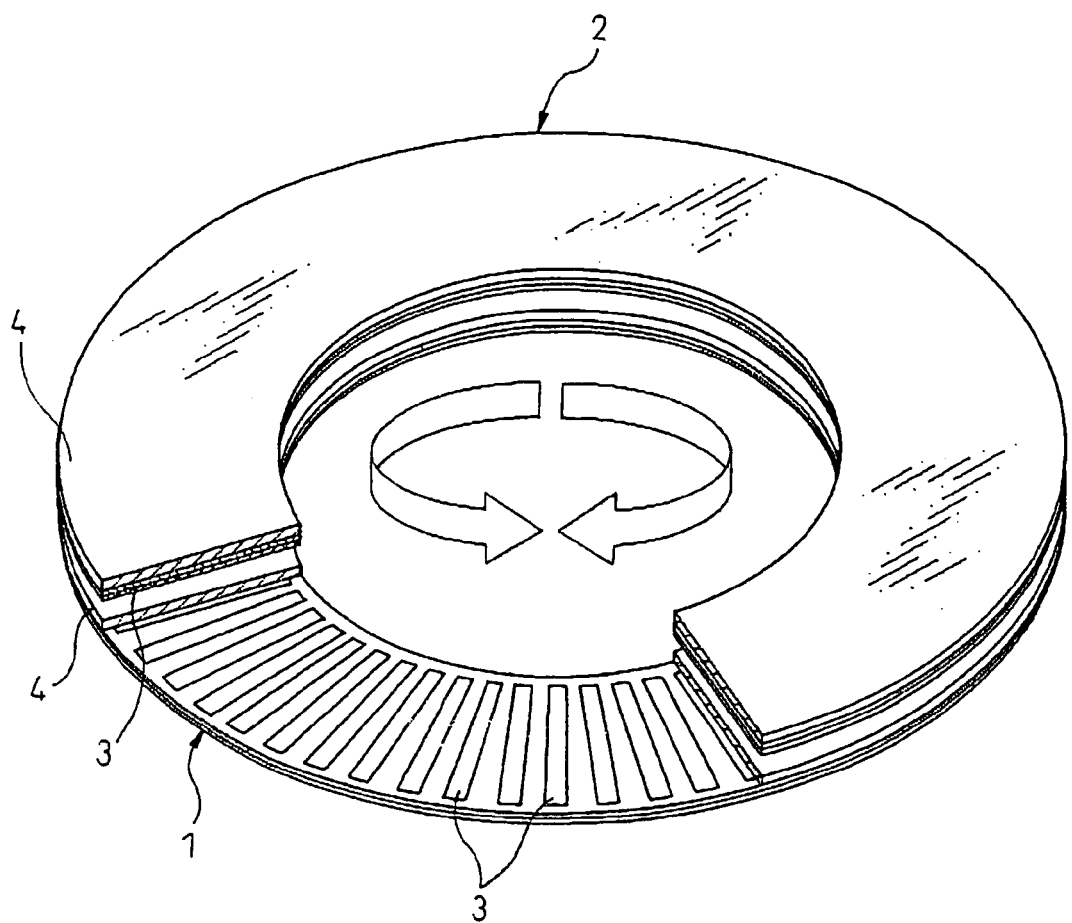
FIG. 21 is a schematic perspective view of a conventional rotary electrostatic motor.
Figure 22A:
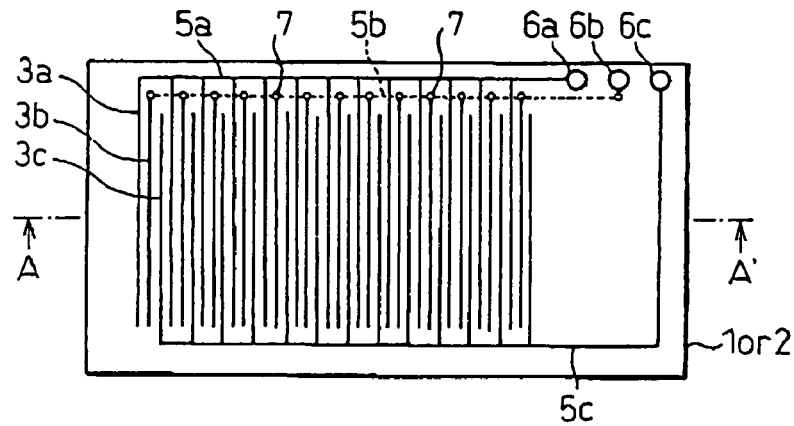
FIGS. 22A to 22C are views explaining stator and slider film electrodes of the conventional electrostatic motor.
Figure 22B:
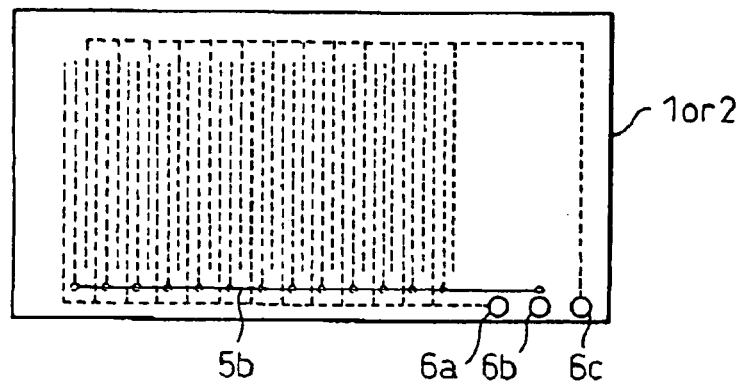
Figure 22C:
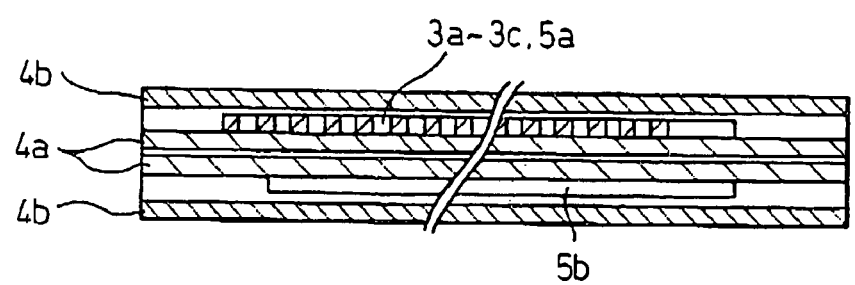
Figure 23:
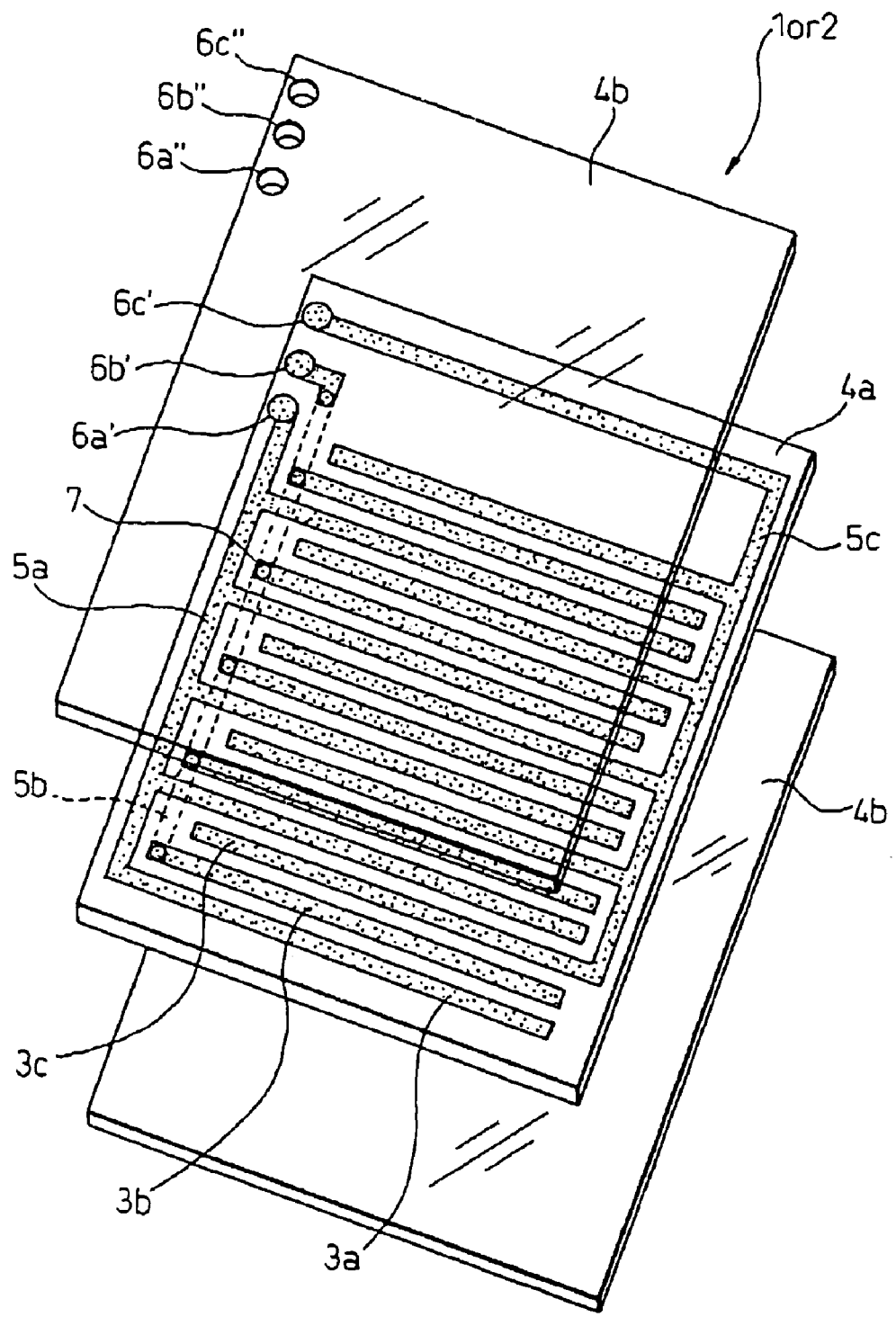
FIG. 23 is a view explaining the process of assembly of a film electrode of the conventional electrostatic motor.
Figure 24:
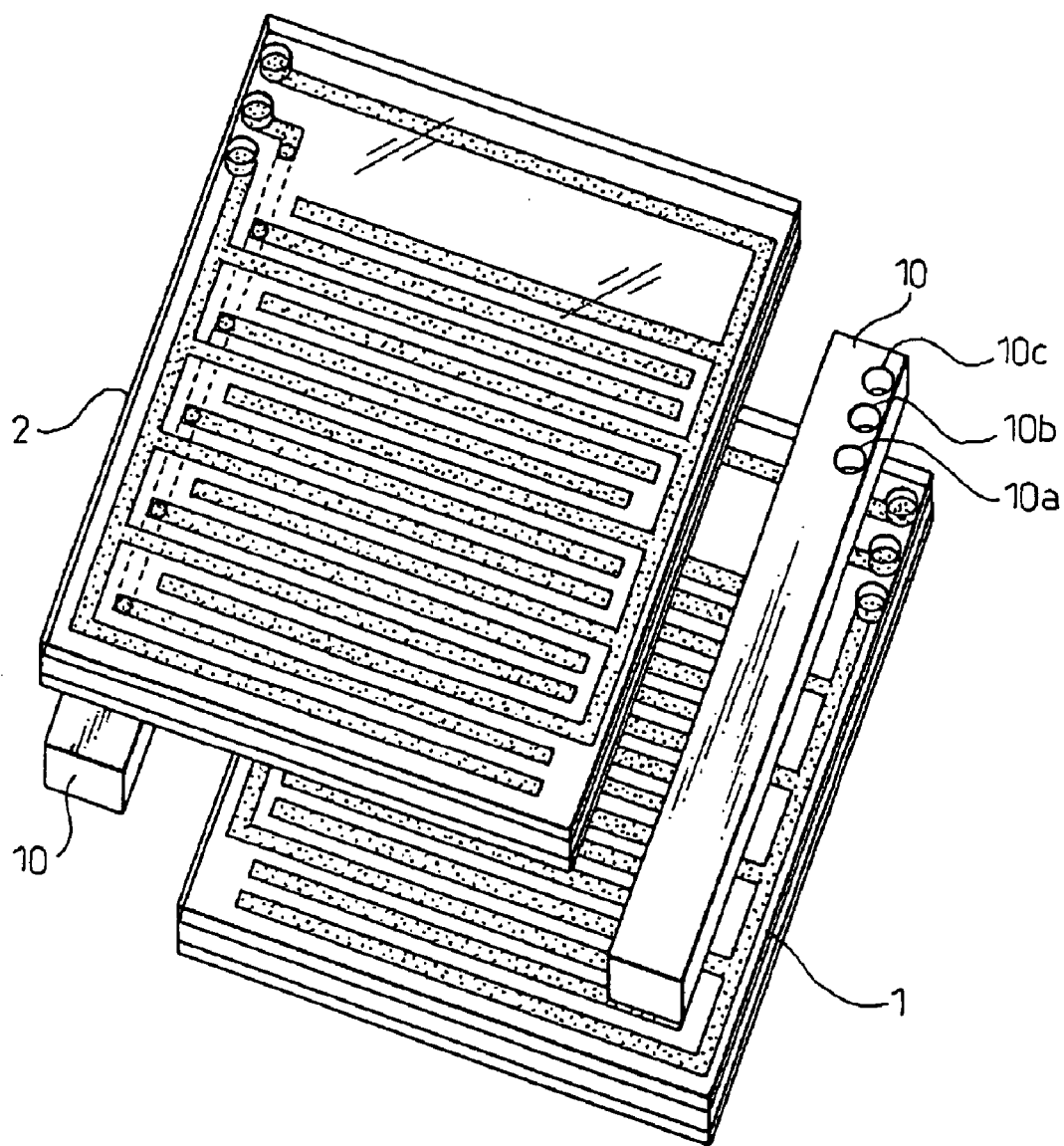
FIG. 24 is a perspective view of the conventional electrostatic motor in which spacer members are provided on the film electrodes.
Figure 25:
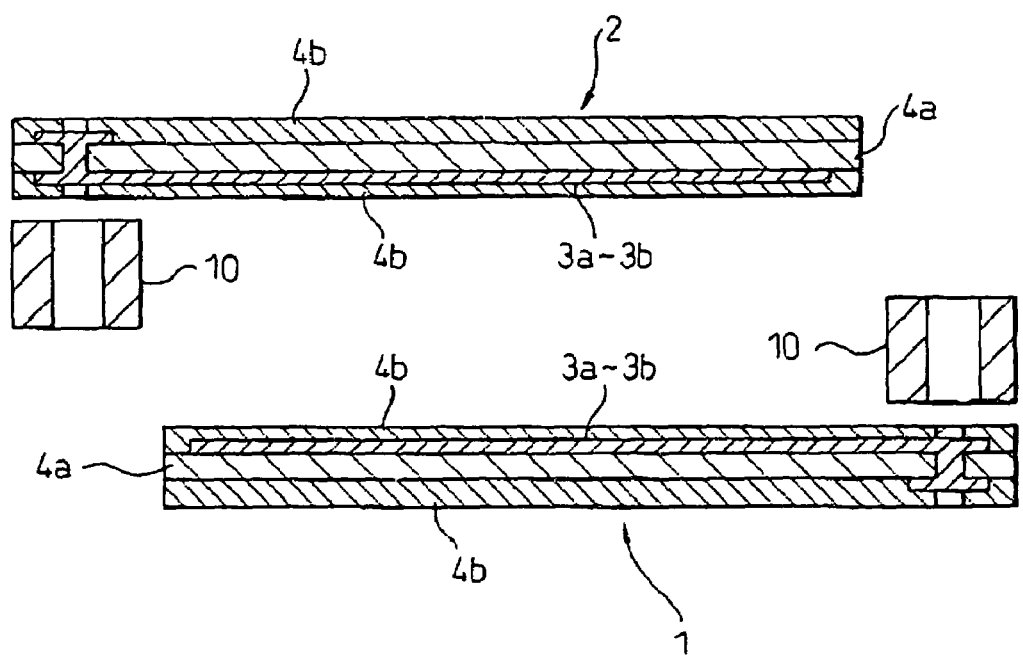
FIG. 25 is a side sectional view of the electrostatic motor shown in FIG. 24.
Figure 26:
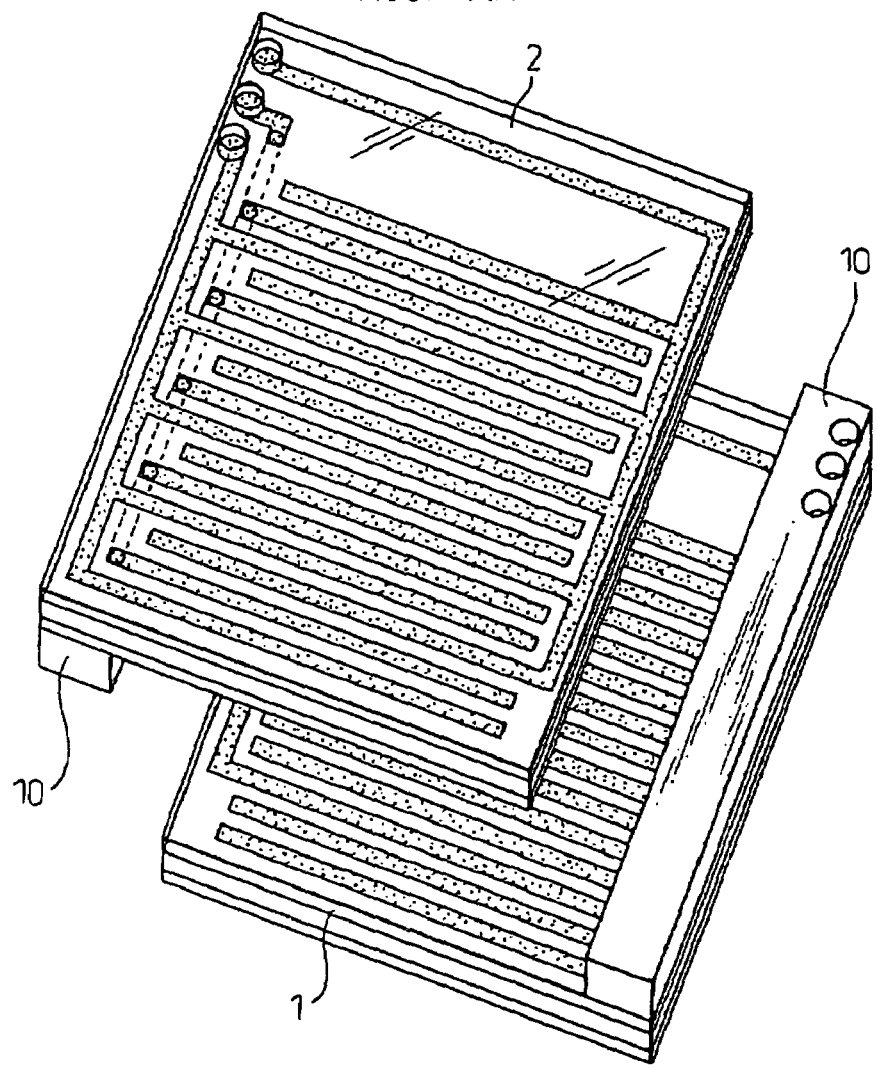
FIG. 26 is a perspective view of the conventional electrostatic motor in which the spacer members are assembled on the stator film electrode and the slider film electrode.
Figure 27:
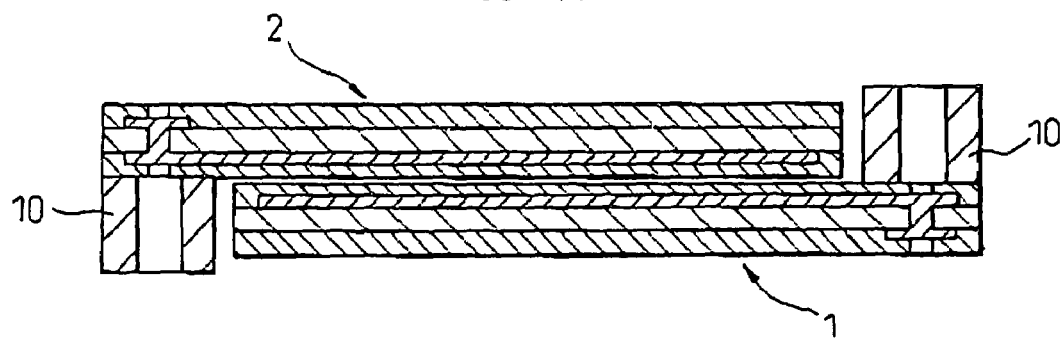
FIG. 27 is a side sectional view of the conventional electrostatic motor in which the stator film electrode and the slider film electrode are arranged facing each other.

FIG. 1 to FIG. 4 are views for explaining a process of assembly of an electrostatic motor using spacer member-equipped film electrodes according to a first embodiment of the present invention. The electrostatic motor of the present invention, in the same way as the past, can be constructed as a linear electrostatic motor or a rotary electrostatic motor such as shown in FIG. 20 and FIG. 21, but in this embodiment, the example of the electrostatic motor constructed as a linear electrostatic motor will be explained. Elements corresponding to elements of the prior art shown in FIG. 20 to FIG. 28 are assigned the same reference numerals.

Note that in FIGS. 1, 2, 5, 6, 9, 10, 14, 15, 16, 17, 12 and 19, the cover films 4b are illustrated as being transparent members for convenience in illustration, but the cover films 4b do not have to be transparent members.

The steps until forming on the base film 4a the electrode elements 3a to 3c and the patterns of the power feed paths 5a to 5c to be connected to the electrode elements 3a to 3c are the same as the process of production of a conventional electrostatic motor. That is, etching etc. is used to form patterns for forming the electrode elements 3a to 3c and the power feed paths 5a to 5c from thin strip-shaped films comprised of copper foil or another electric conductor bonded to the base film 4a. Next, the base film 4a is formed with through holes and the through holes are plated to form through hole conductive parts 7 so as to electrically connect the power feed paths 5b formed on one surface of the base film 4a and the electrode elements 3b formed on the other surface thereof. In the first embodiment, the surface of the base film 4a on the side where the electrode elements 3a to 3c are formed is provided with power feed paths 5a, 5c for feeding power to the first and third electrode elements 3a, 3c, while the opposite surface of the base film 4a is provided with a power feed path 5b for feeding power to the second electrode elements 3b.

A spacer member 10 for forming a step is bonded to an end of the thus formed base film 4a provided with the electrodes 3a to 3c and the power feed paths 5a to 5c. This spacer member 10 is made from an insulating material. It may be made from the same material as the base film 4a. Next, in the state with the spacer member 10 bonded to the base film 4a, holes (holes for forming the through hole conductive parts 6a to 6c) are formed in the spacer member 10 and the base film 4a. Next, these holes are plated to form the through hole conductive parts 6a' to 6c' and the through hole conductive parts 7 to electrically connect the through hole conductive parts and power feed paths 5a to 5c of the base film 4a. Instead of bonding the spacer member 10 to the base film 4, it is also possible to rivet or screw the spacer member 10 to the base film 4a.

Figure 2:
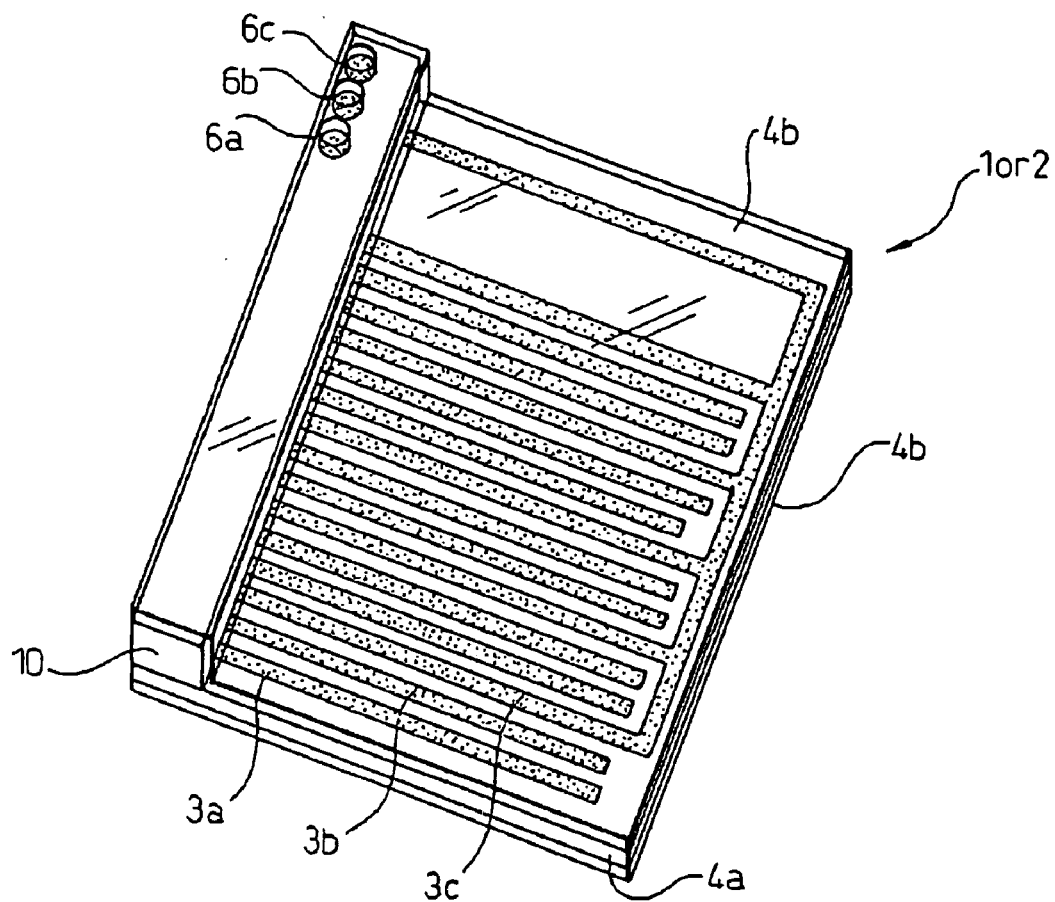
FIG. 2 is a perspective view of the spacer member-equipped film electrode shown in FIG. 1 assembled by bonding a spacer member to a film electrode body and then bonding cover films over it.

After this, as shown in FIG. 2, cover films 4b, 4b formed with the through hole conductive parts 6a" to 6c" are bonded to the assembly of the base film 4a and the spacer member 10 at its two surfaces to form through hole conductive parts 6a to 6c and integrally form a stator or slider film electrode 1 or 2 with a step formed by the spacer member 10.

Figure 3:
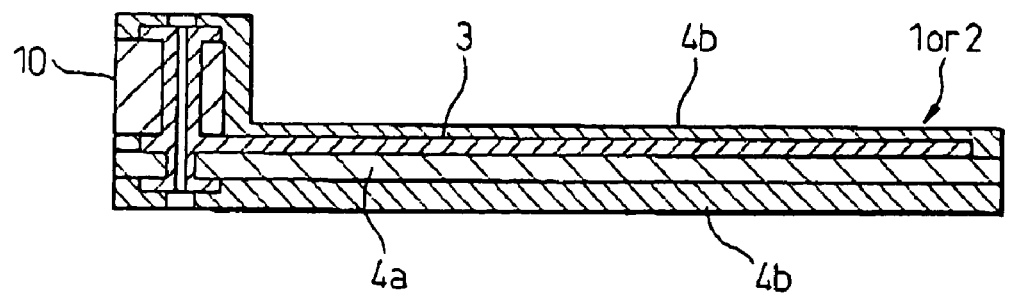
FIG. 3 is a cross-sectional view of the spacer member-equipped film electrode shown in FIG. 2.

FIG. 3 is a cross-sectional view of a stator or slider film electrode 1 or 2 produced in this way. As shown in FIG. 2 and FIG. 3, the stator or slider film electrode 1 or 2 is formed integrally with the spacer member 10. Therefore, it is reinforced by the rigidity of the spacer member, so that handling of the film electrode 1 or 2 becomes easier.

Figure 4:
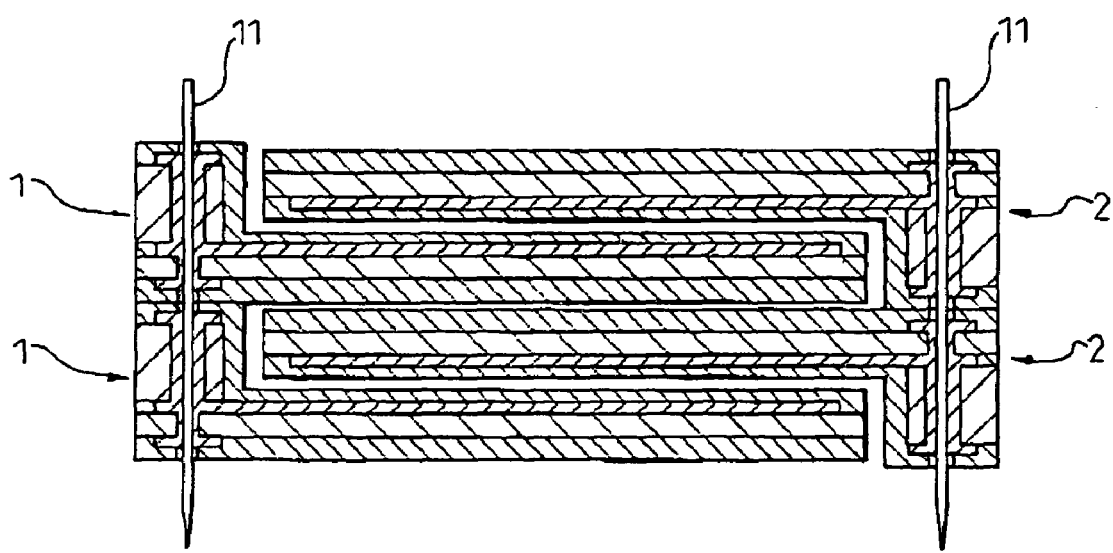
FIG. 4 is a cross-sectional view of an electrostatic motor constructed by stacking a plurality of the spacer member-equipped film electrodes shown in FIG. 2 as stator and slider film electrodes and providing means for feeding power to the film electrodes.

Utilizing this, as shown in FIG. 4, a plurality of sets of stator film electrodes 1 and slider film electrodes 2 each obtained by arranging the drive electrode surface of a stator film electrode 1 and the drive electrode surface of the slider film electrode 2 to face each other are stacked so that the through hole conductive parts 6a to 6c of the stator and slider film electrodes 1, 2 are arranged on the same lines. Next, conductive pins 11 are inserted into the through holes to enable power to be fed to the electrode elements of the stator film electrodes 1 and the electrode elements of the slider film electrodes 2. In the same way as the conventional example shown in FIG. 28B, when using connection parts 12 such as conductive rubber or conductive metal springs instead of the conductive pins 11, instead of inserting the conductive pins 11 into the through hole conductive parts of the spacer member 10, it is also possible to bring the tips of the connection parts 12 into abutment with or engage them with the through hole conductive parts 6a to 6c of the stator film electrodes 1 and slider film electrodes 2 so as to electrically connect the through hole conductive parts and the connection parts 12.

After this, the stator film electrodes 1 are fastened to a stator housing and the slider film electrodes 2 are fastened to a slider housing, thereby obtaining the electrostatic motor.

Note that in the above embodiment, the spacer member 10 is secured to the base film 9a by bonding etc. and the outsides thereof are covered by cover films 4b to form the film electrodes 1, 2. However, it is also possible to form a flat film electrode with no step, and then bond, rivet, or screw a spacer member to this flat film electrode to form a film electrode with a step.

FIG. 5 to FIG. 8 are views for explaining a process of assembly of an electrostatic motor using spacer member-equipped film electrodes according to a second embodiment of the present invention. This second embodiment differs from the first embodiment in the point that it makes the end of the surface at the opposite side to the side of the base film 4a' where the electrode elements 3a to 3c are formed thicker to integrally form a step and uses this projecting part as the spacer member 10'.

Figure 5:
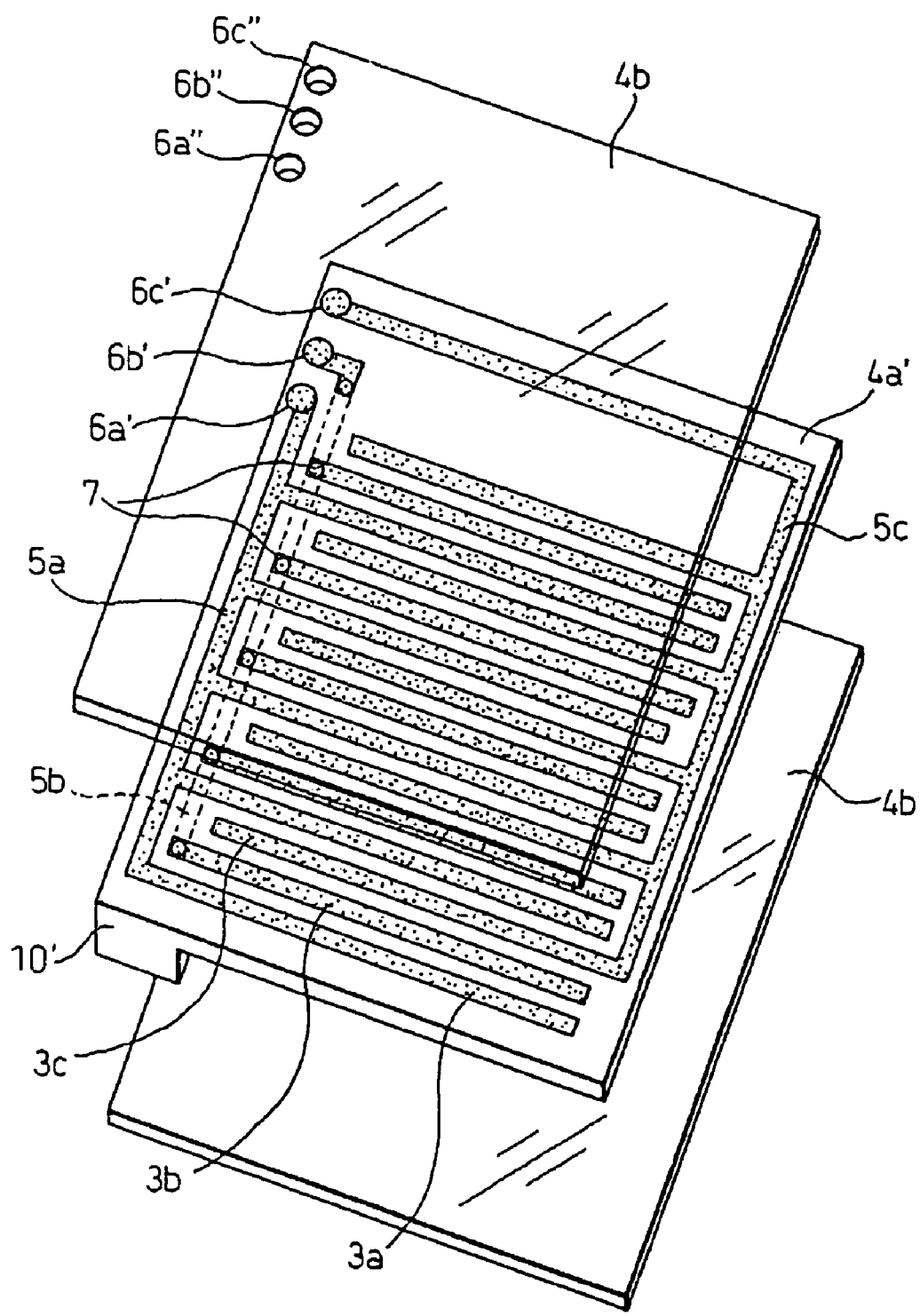
FIG. 5 is an exploded view of a spacer member-equipped film electrode of an electrostatic motor according to a second embodiment of the present invention.

As shown in FIG. 5, one end of the base film 4a' is formed with a step projecting out compared with the other parts. Further, the side of the base film 4a' where the electrode elements 3a to 3c are provided, that is, the opposite side to the side where the step is formed, is a flat shape with no step. Further, the part where the step forming the spacer member 10' is provided is provided with power feed paths 5a, 5b for feeding power to the electrode elements 3a, 3b. In the second embodiment, the flat surface on the side where the electrode elements 5a, 5b are provided is provided with the power feed path 5a for feeding power to the first electrode elements 3a, while the opposite surface is provided with the power feed path 5b for feeding power to the second electrode elements 3b and through hole conductive parts 7 are used to electrically connect to second electrode elements 3b arranged at the opposite surface. The power feed paths 5c to the third electrode elements 3c are provided at the flat surface side where the electrodes 3a to 3c are provided. The base film 4a' with the step may be fabricated by extrusion, injection molding, etc.

Figure 6:
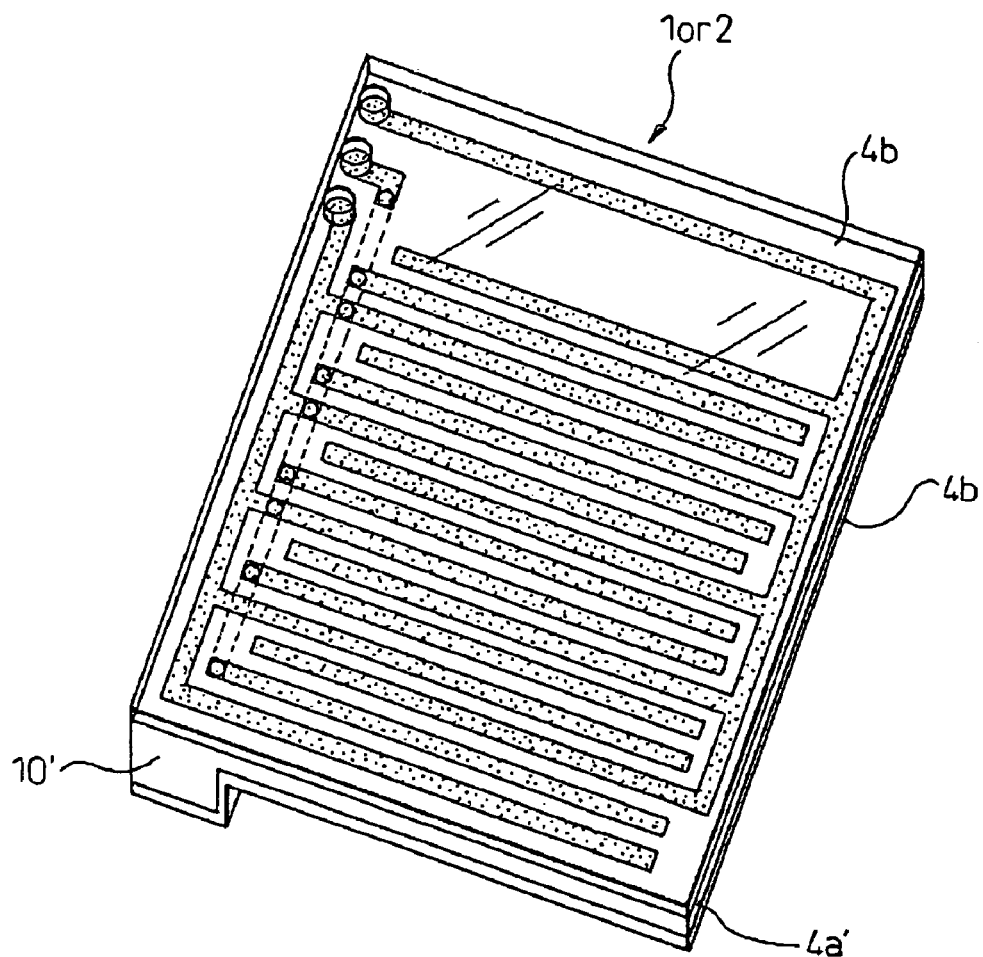
FIG. 6 is a perspective view of the spacer member-equipped film electrode shown in FIG. 5 after assembly.
Figure 7:
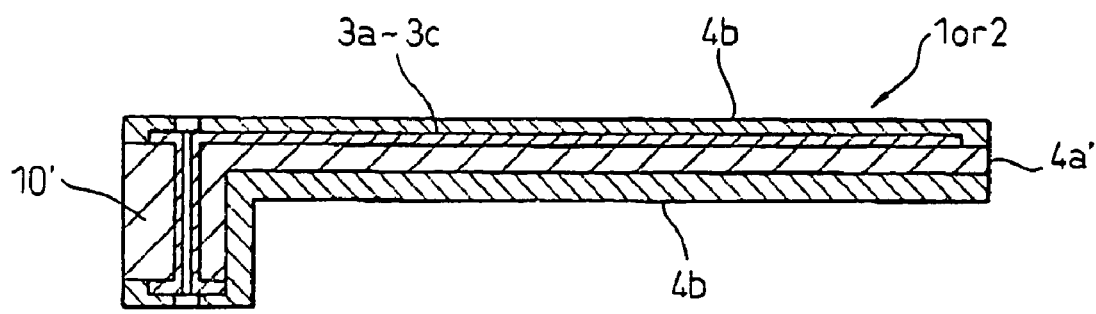
FIG. 7 is a cross-sectional view of the spacer member-equipped film electrode shown in FIG. 6.

The base film 4a' is formed with through holes, which are then plated to form conductive parts 6a to 6c, 7. Thereafter, as shown in FIG. 6, cover films 4b having through hole conductive parts 6a" to 6c" are bonded to the two surfaces of he base film 4a' having the step, thereby to form a stator or slider film electrode 1 or 2. FIG. 7 is a cross-sectional view of the film electrode thus prepared.

Figure 8:
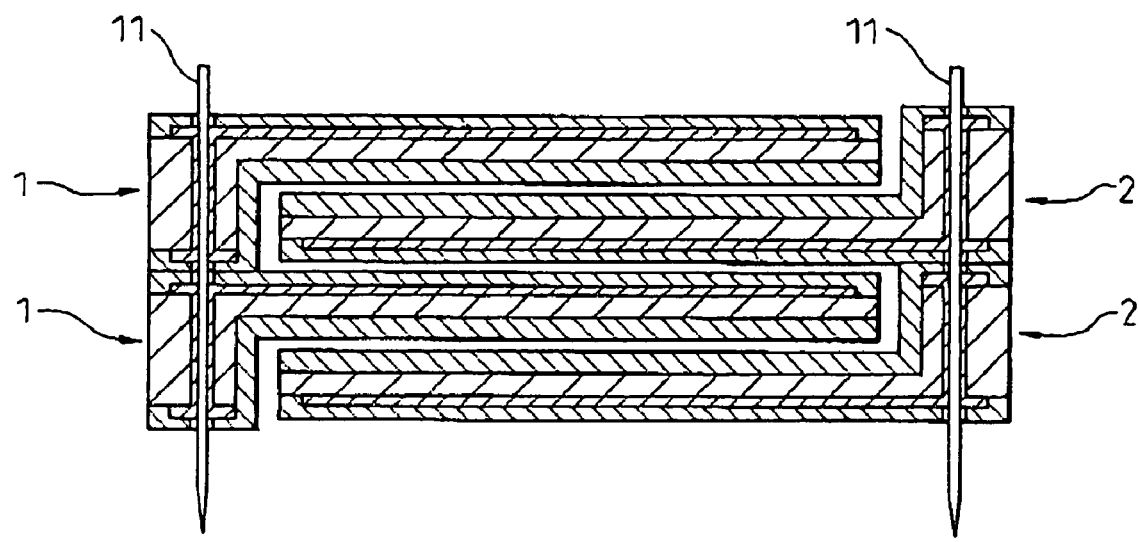
FIG. 8 is a cross-sectional view of an electrostatic motor constructed by stacking a plurality of spacer member-equipped film electrodes shown in FIG. 6 as stator and slider film electrodes and providing means for feeding power to the film electrodes.
Figure 9:
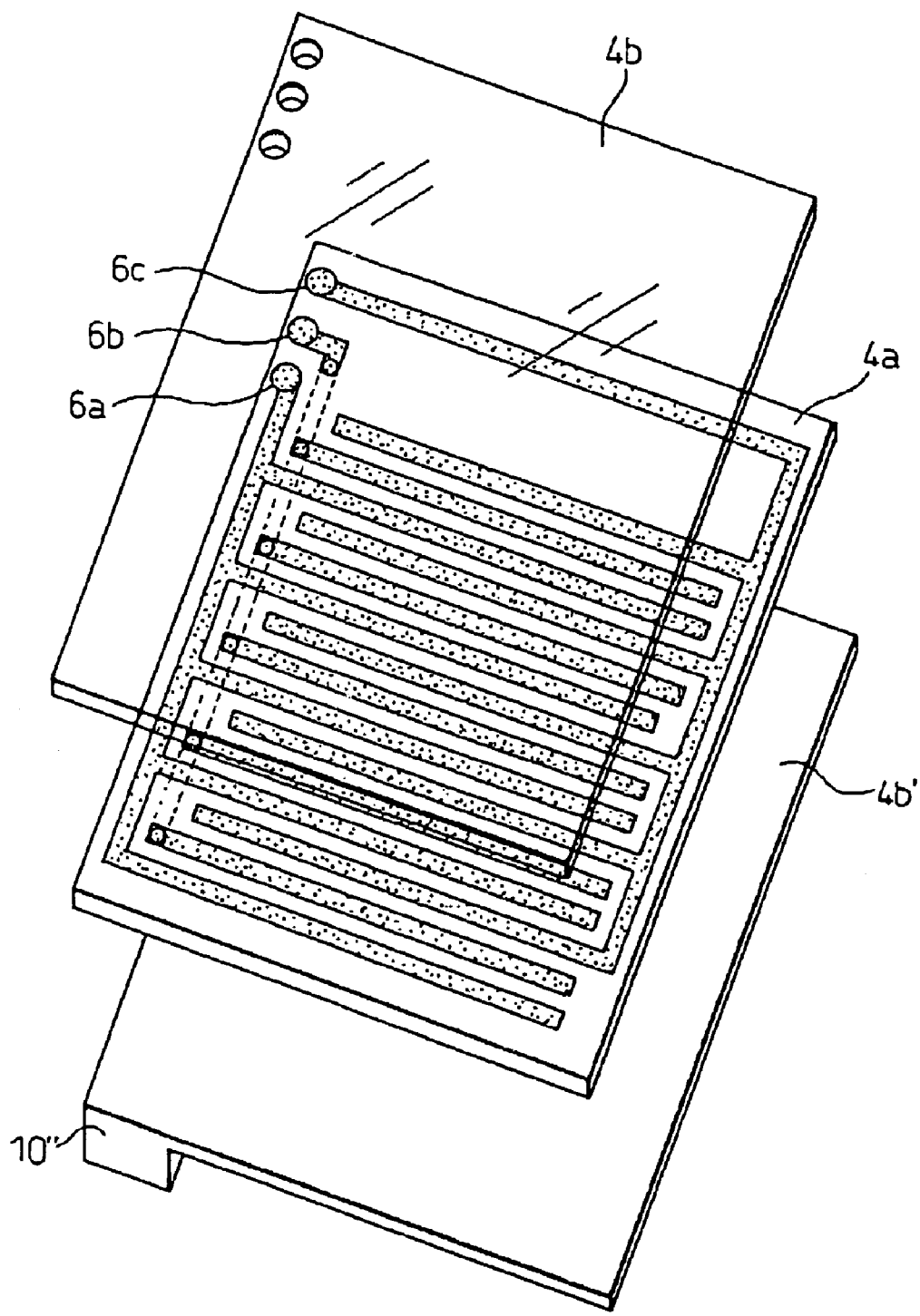
FIG. 9 is an exploded view of a spacer member-equipped film electrode of an electrostatic motor according to a third embodiment of the present invention.
Figure 28A:
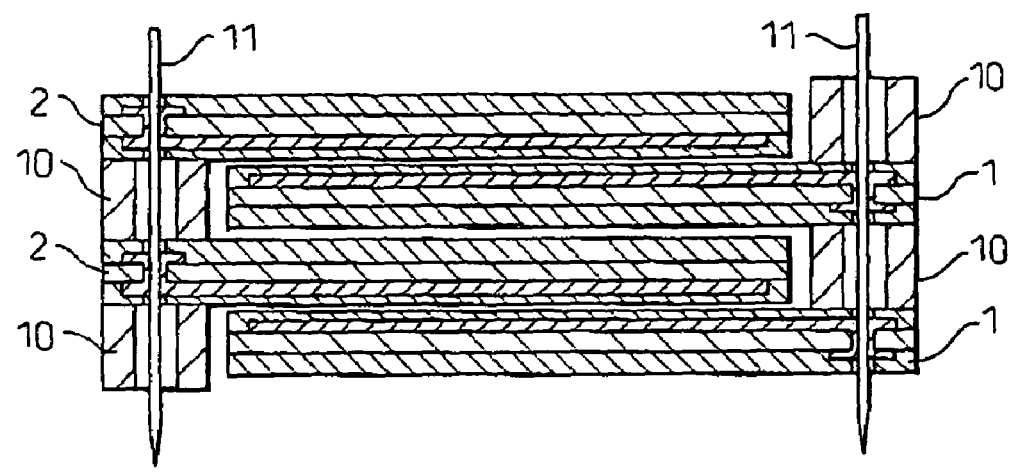
FIG. 28A and 28B are side sectional views of the conventional electrostatic motor in which a plurality of sets of stator film electrodes and slider film electrodes are stacked and the electrode elements thereof are electrically connected.
Figure 28B:
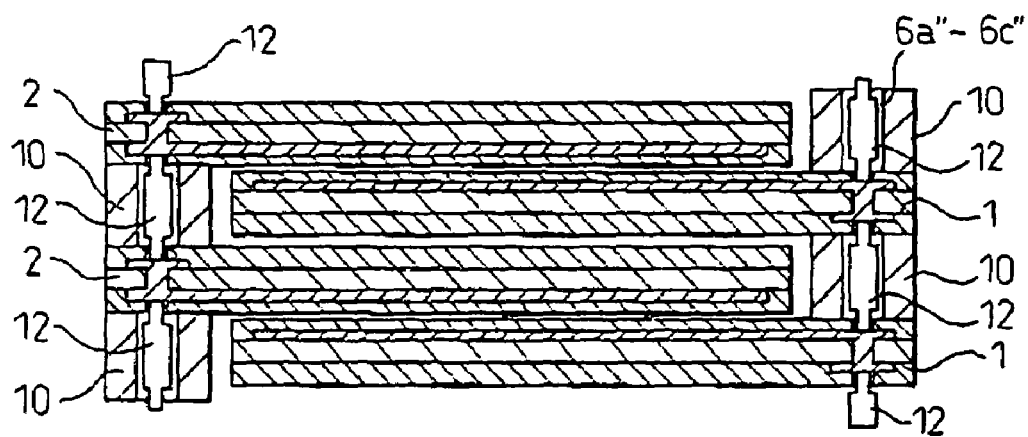

The drive electrode surface of the thus prepared stator film electrode 1 and the drive electrode surface of the thus prepared slider film electrode 2 are arranged facing each other to form a set of the stator film electrode 1 and the slider film electrode 2. A plurality of such sets of stator film electrodes 1 and slider film electrodes 2 are stacked so that the through hole conductive parts 6a to 6c (6a' to 6c' and 6a" to 6c") of the stator and slider film electrodes 1, 2 are arranged on the same lines. Further, as shown in FIG. 8, conductive pins 11 are inserted into the through holes to enable power to be fed to the electrode elements of the stator film electrodes 1 and the electrode elements of the slider film electrodes 2. As shown in FIG. 28B of the prior art, it is of course also possible to use connection parts 12 formed by conductive rubber or conductive metal springs to connect the film electrodes 1, 2 with each other.

After this, the stator film electrodes 1 are fastened to a stator housing and the slider film electrodes 2 are fastened to a slider housing to obtain an electrostatic motor.

FIG. 9 to FIG. 12 are views for explaining a process of assembly of an electrostatic motor using spacer-member equipped film electrodes according to a third embodiment of the present invention. The third embodiment differs from the first embodiment in the point that the spacer member 10" is integrally provided with one cover film. The rest of the configuration is the same as the first embodiment.

Figure 10:
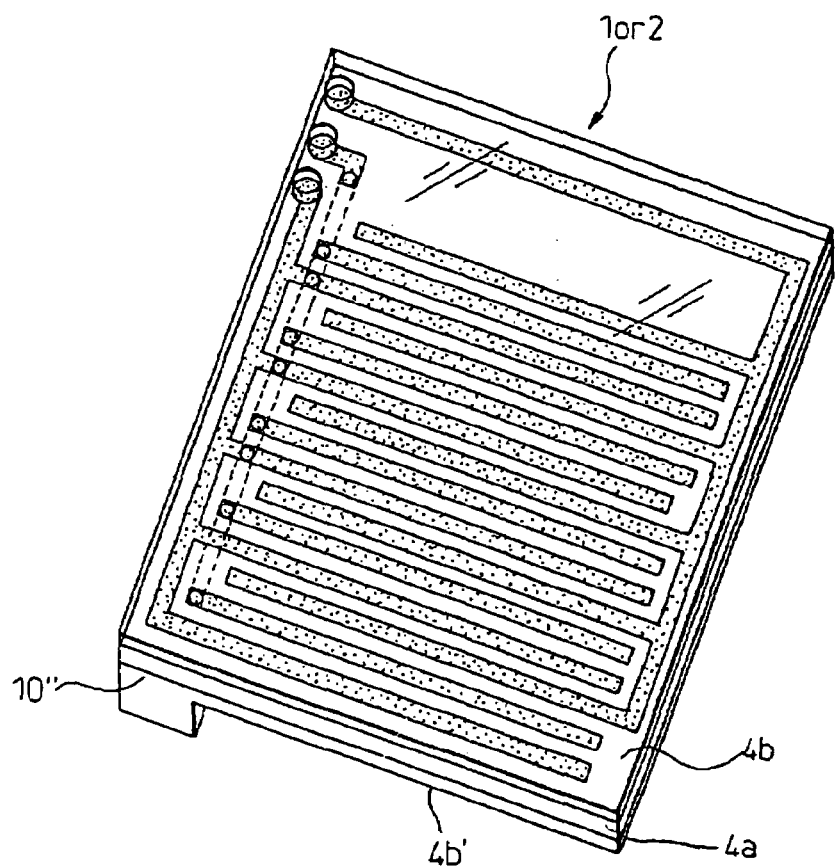
FIG. 10 is a perspective view of the spacer member-equipped film electrode shown in FIG. 9 after assembly.
Figure 11:
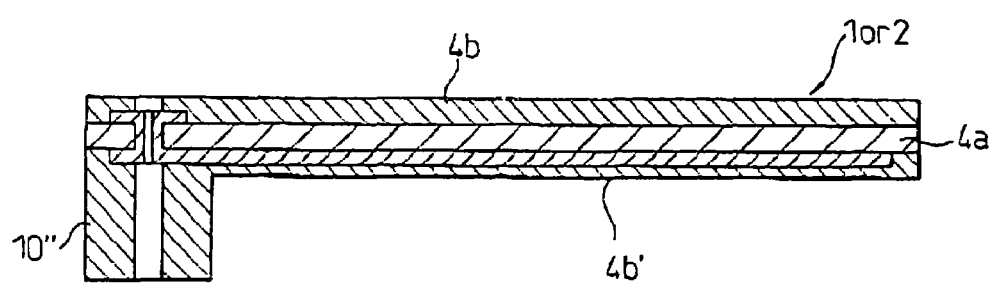
FIG. 11 is a cross-sectional view of the spacer member-equipped film electrode shown in FIG. 10.
Figure 12:
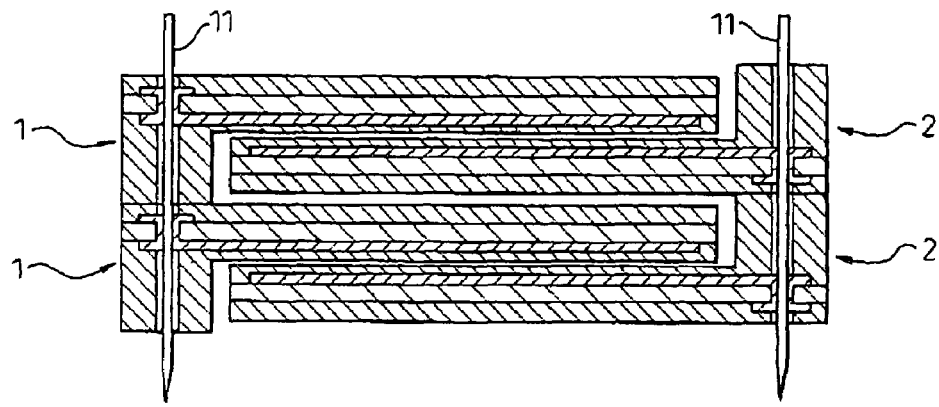
FIG. 12 is a cross-sectional view of an electrostatic motor constructed by stacking a plurality of spacer member-equipped film electrodes shown in FIG. 10 as stator and slider film electrodes and providing means for feeding power to the film electrodes.

A base film 4a is provided with electrode elements 3a to 3c, power feed paths 5a to 5c, and through holes. The through holes are plated to form conductive parts 6a to 6c and 7. A cover film 4b with no step is bonded to one surface of the base film 4a, and a cover film 4b' provided with a step forming the step member 10" is bonded to the other surface of the base film 4a, whereby a stator or slider film electrode 1 or 2 shown in FIG. 10 is obtained. FIG. 11 is a cross-sectional view of a thus obtained film electrode 1 or 2. The through holes provided in the cover films 4b, 4b' may be formed after bonding to the base film 4a or formed before bonding.

The drive electrode surface of the thus formed stator film electrode 1 and the drive electrode surface of the thus formed slider film electrode 2 are arranged facing each other and, in the same way as in the first and second embodiments, conductive pins 11 inserted into the through holes or connection parts 12 formed by conductive rubber or conductive metal springs are used to enable power to be fed to the electrodes of the stator film electrodes 1 and the electrodes of the slider film electrodes 2. After this, the stator film electrodes 1 are fastened to a stator housing and the slider film electrodes 2 are fastened to a slider housing to obtain an electrostatic motor (see FIG. 12).

FIG. 13 to FIG. 16 are views for explaining a process of assembly of a spacer member-equipped film electrode of an electrostatic motor according to a fourth embodiment of the present invention.

Figure 13:
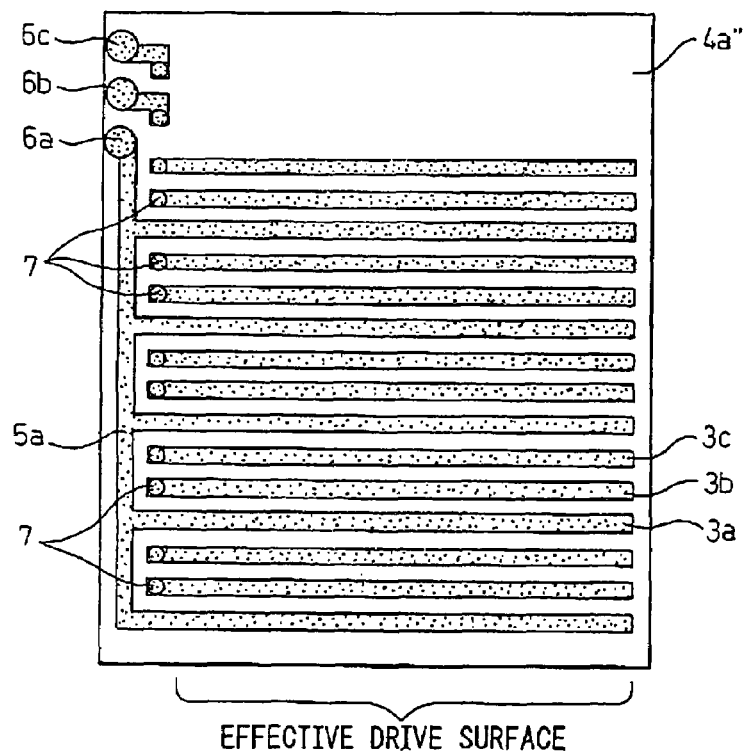
FIG. 13 is a view for explaining electrode elements, power feed paths, etc. provided at a base film in a spacer member-equipped film electrode of an electrostatic motor according to a fourth embodiment of the present invention.
Figure 14:
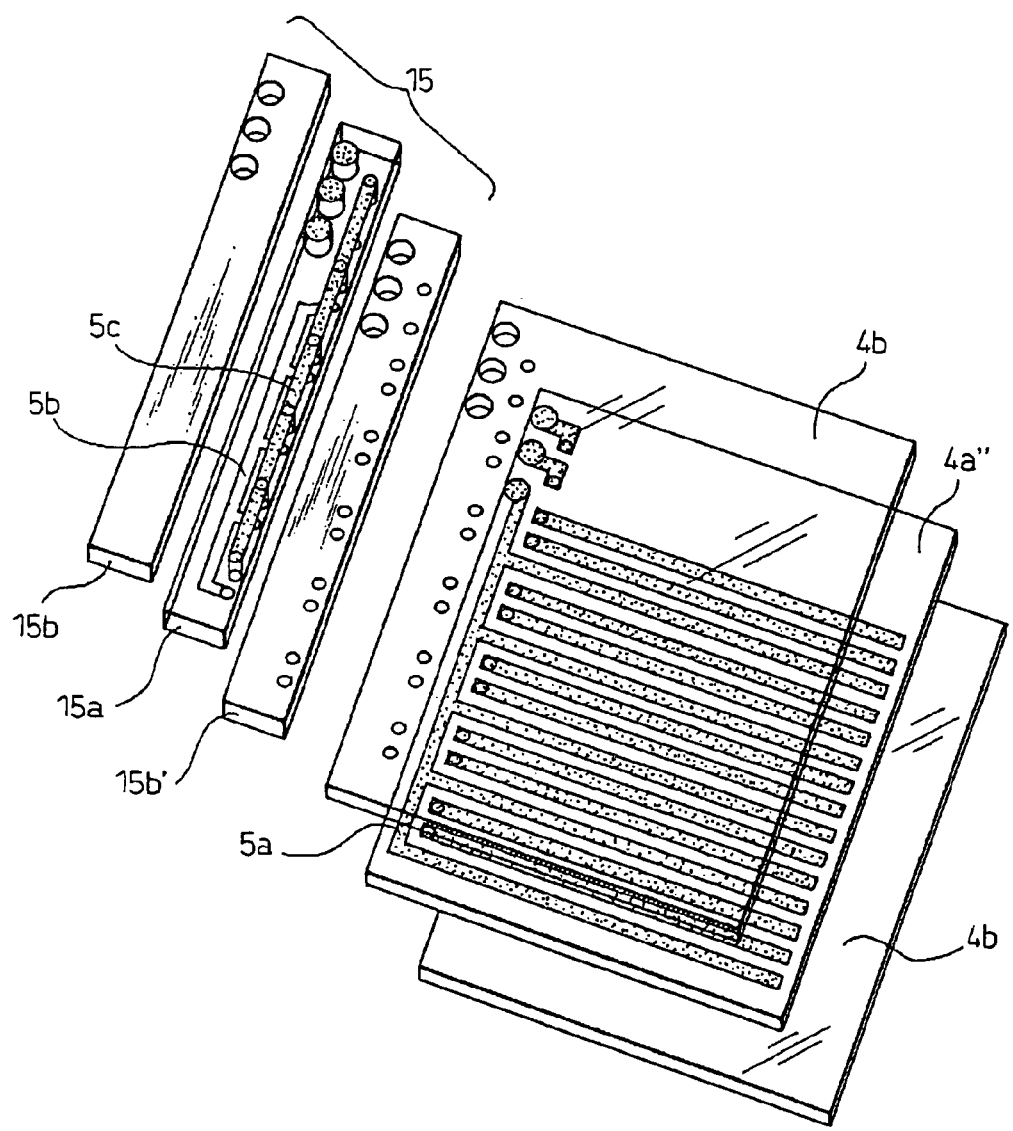
FIG. 14 is an exploded view of the spacer member-equipped film electrode of the electrostatic motor according to the fourth embodiment of the present invention.

In the fourth embodiment, as shown in FIG. 13, a base film 4a" is only formed with a power feed path 5a to the first electrode elements 3a among the power feed paths to the different phase electrode elements. Unlike the base film 4a in the first embodiment shown in FIG. 1, in the fourth embodiment, the power feed paths 5b, 5c to the second and third electrode elements 3b, 3c are not provided on the base film 4a". In the fourth embodiment, the base film 4a" is provided with the different phase electrode elements 3a, 3b, 3c, through hole conductive parts 6a, 6b, 6c connected to the different phases of the power supply, a power feed path 5a for connecting the through hole conductive part 6a connected to the first phase power supply for feeding power to the first phase electrode elements 3a and the first phase electrode elements 3a, and power feed paths for connecting the through hole conductive parts 7, 7 for connection to the second and third phase power feed paths 5b, 5c provided on the spacer member 15 and the through hole conductive parts 6b, 6c connected to the second and third phase power supplies. Cover films 4b, 4b are bonded to the top and bottom surfaces of the base film 4a' to form a stator or slider film electrode 1 or 2.

Figure 15:
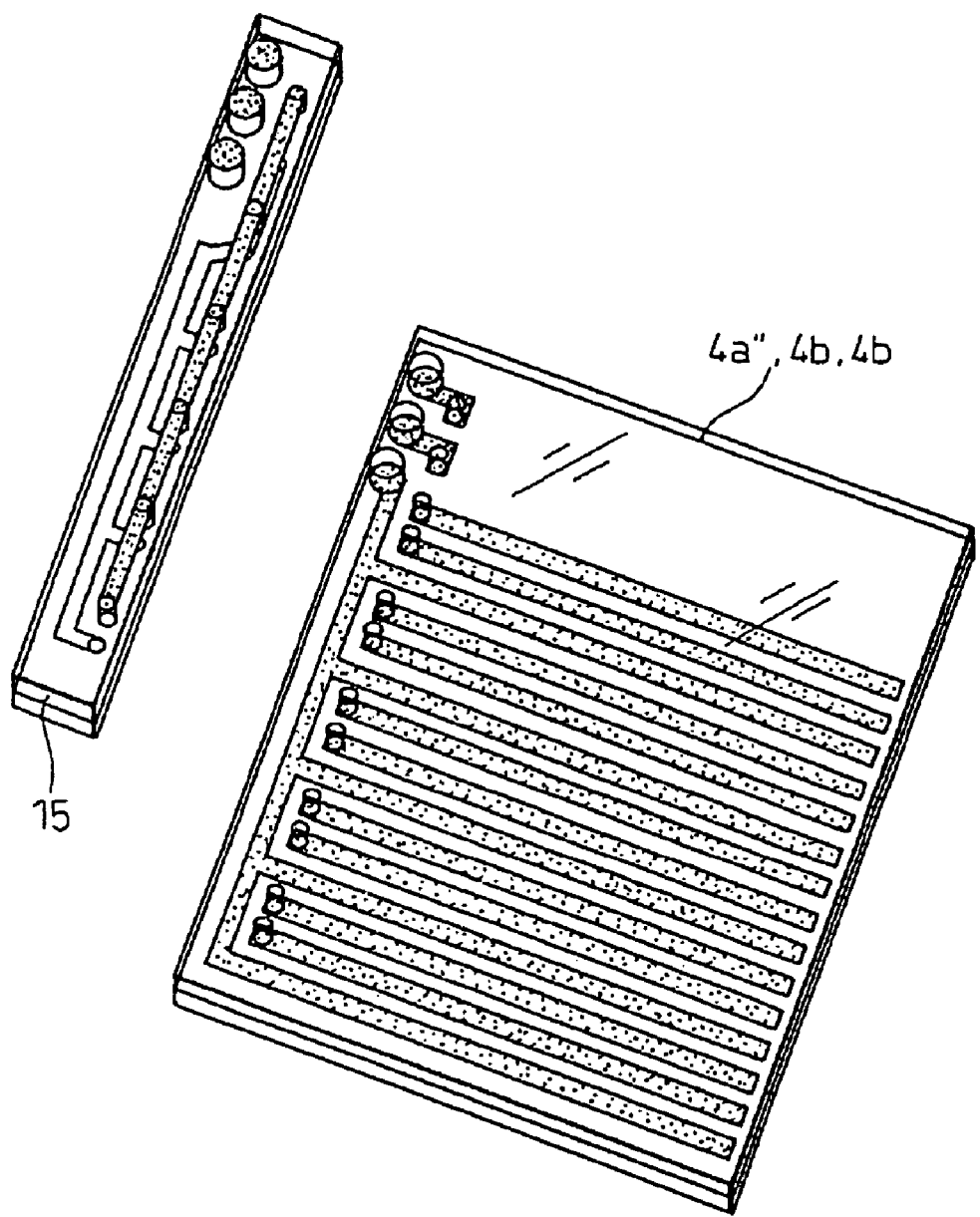
FIG. 15 is a view for explaining a process of bonding a spacer member to a film electrode in the assembly of the spacer member-equipped film electrode shown in FIG. 14.
Figure 16:
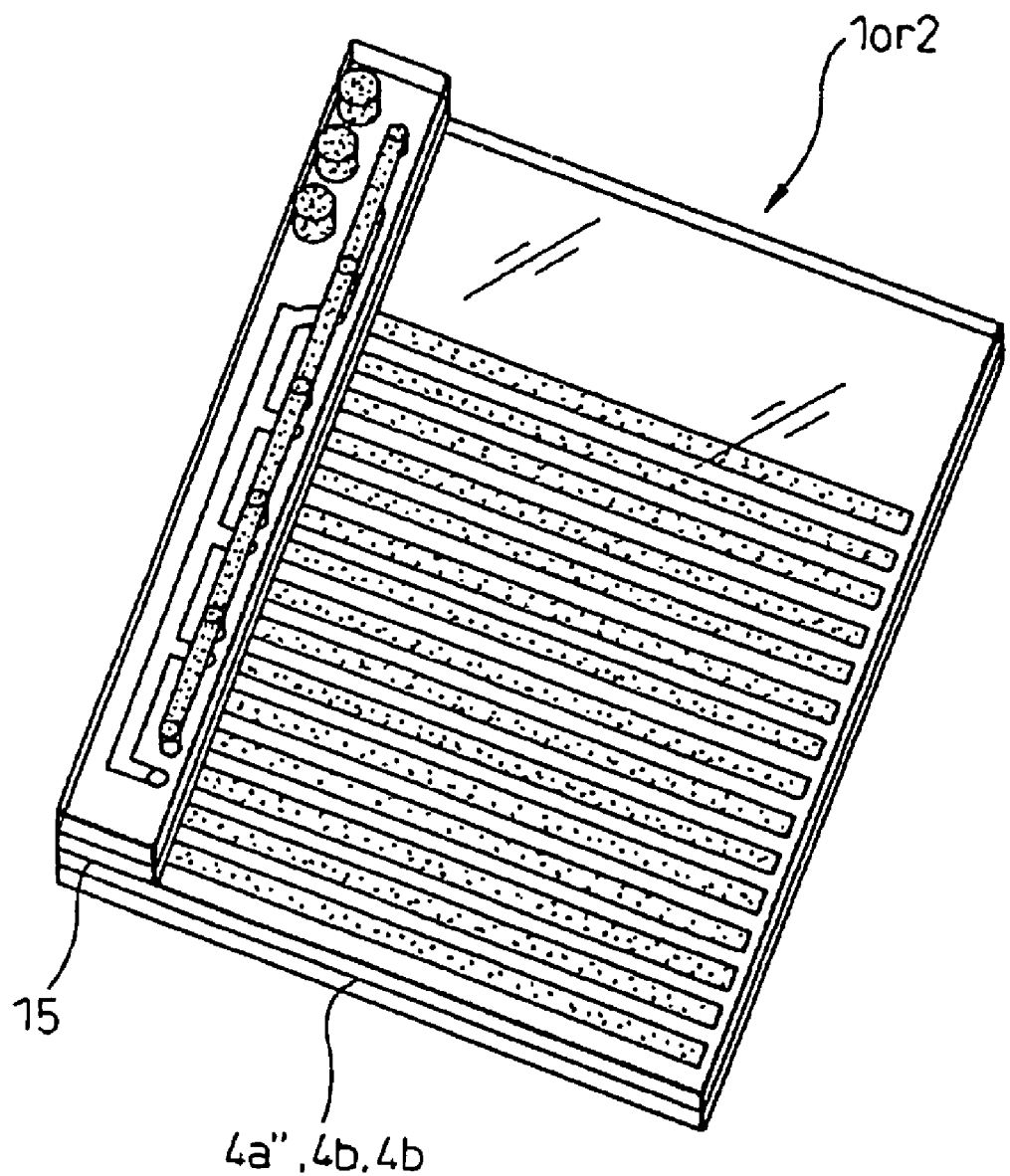
FIG. 16 is a perspective view of the spacer member-equipped film electrode after assembly.

On the other hand, the spacer member 15 is constructed by a base film 15a formed with power feed paths 5b, 5c and cover films 15b, 15b'. By etching etc., the base film 15a is formed on one surface with the power feed path 5b to be connected to the second electrode elements 3b and on the other surface with the power feed path 5c to be connected to the third electrodes 3c. Further, as shown in FIG. 15 and FIG. 16, the cover film 15b' is bonded to the bottom surface of the base film 15. The thus formed assembly is further bonded to the film electrode 1 or 2. After this, a drill etc. is used to form the through hole conductive parts 6a to 6c, 7, and then the thus formed holes are plated to form conductive parts. Thereafter, the outermost surfaces of the spacer members 15 are bonded or coated with cover films 15b so as to obtain a film electrode provided with a spacer member. After this, in the same way as the first to third embodiments, the drive electrode surface of the stator film electrode 1 and the drive electrode surface of the slider film electrode 2 are arranged facing each other to form a set of the stator film electrode 1 and the slider film electrode 2, and a plurality of such sets of the stator film electrodes 1 and the slider film electrodes 2 are stacked. Further, in the same way as the second embodiment, conductive pins 11 or connection parts such as conductive rubber or conductor member metal springs etc. are used in the through holes to enable power to be fed to the electrode elements of the stator film electrodes 1 and the electrodes of the slider film electrodes 2. After this, the stator film electrodes 1 are fastened to a stator housing and the slider film electrodes 2 are fastened to a slider housing to obtain an electrostatic motor.

Figure 17:
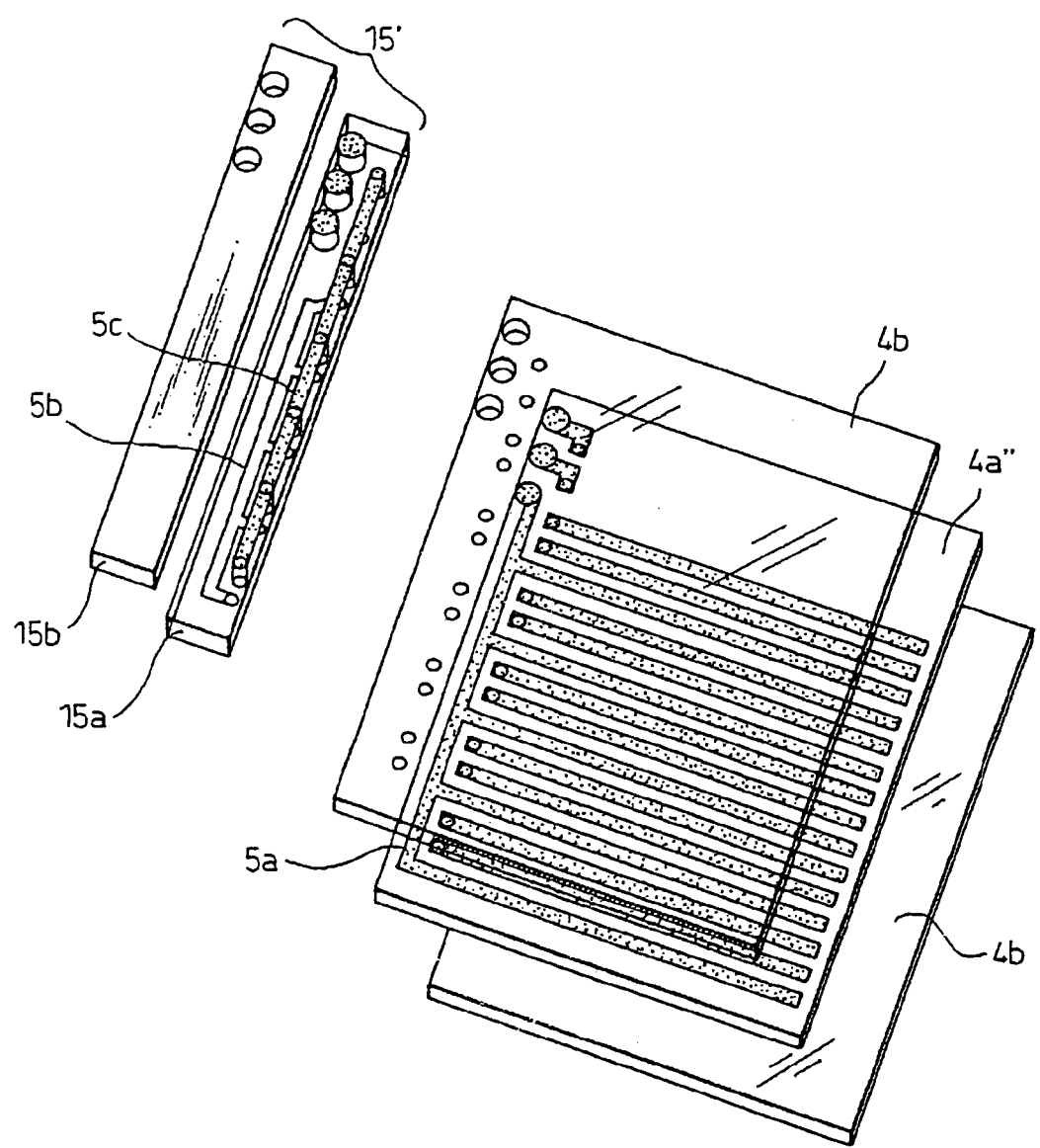
FIG. 17 is an exploded view showing a modification of the spacer member-equipped film electrode of the fourth embodiment in which the cover film below the spacer member is omitted.

In the above fourth embodiment, as the base film 4a' already has the cover film 4b bonded to it, it is not necessarily required to provide the cover film 15b' for bonding to the bottom surface of the base film 15a of the spacer member 15. FIG. 17 shows a spacer member-equipped film electrode 1 or 2 (a film electrode provided with a spacer member 15') fabricated without the cover film 15b' bonded to the bottom surface of the base film 15a of the spacer member 15. The spacer member-equipped film electrode 1 or 2 of the embodiment shown in FIG. 17 is fabricated by the same procedure as the spacer member-equipped film electrode 1 or 2 of the fourth embodiment except for the point of the omission of the cover film 15b40. Further, it is also possible to rivet or screw a spacer member 15 to a film electrode 1 or 2.

Figure 18:
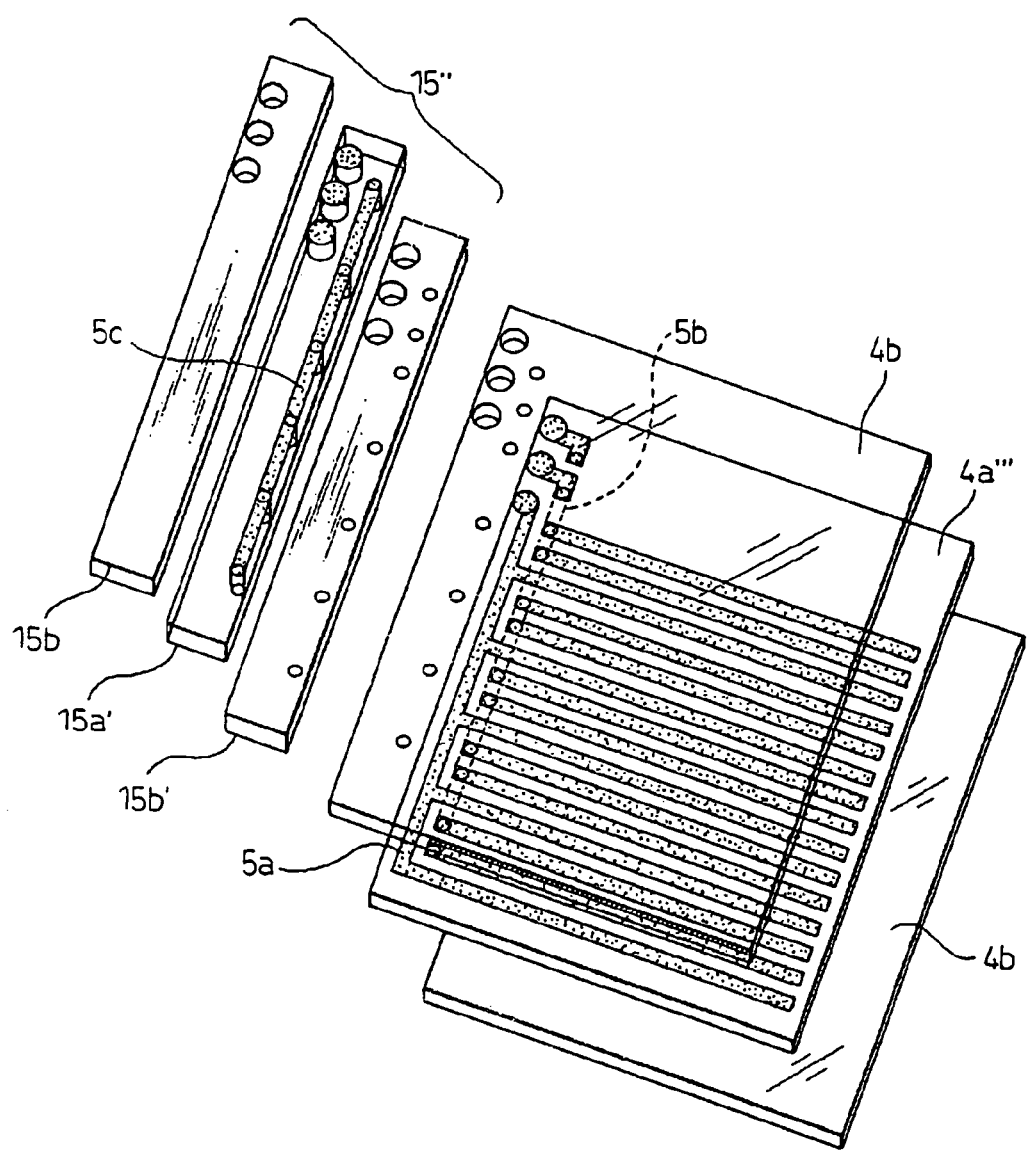
FIG. 18 is an exploded view of a spacer member-equipped film electrode of an electrostatic motor according to a fifth embodiment of the present invention.

FIG. 18 is an exploded view of a stator or slider film electrode 1 or 2 with a spacer member of an electrostatic motor according to a fifth embodiment of the present invention. This fifth embodiment differs from the above-mentioned fourth embodiment in the point that the base film 4a is provided with two phases of power feed paths, while the base film 15a' of the spacer member 15" is provided with a single phase of power feed path. In the illustrated example, the power feed path 5c for feeding power to the third phase electrode elements 3c is provided on the base film 15a' of the spacer member 15", while the power feed path 5a for feeding power to the first phase electrode elements 3a is provided on one surface (front surface) of the base film 4a'" of the film electrode body and the power feed path 5b for feeding power to the second phase electrode elements 3b is provided on the other surface of the base film 4a'". The process of assembly of the electrostatic motor using the spacer-equipped film electrodes 1, 2 is similar to that of the fourth embodiment. Further, in the fifth embodiment as well, the cover film 15b' bonded to the bottom surface of the base film 15a of the spacer member 15 (side to be bonded to film electrode body) may be omitted and the cover film 4b of the base film 4a may be used for insulation.

Figure 1:
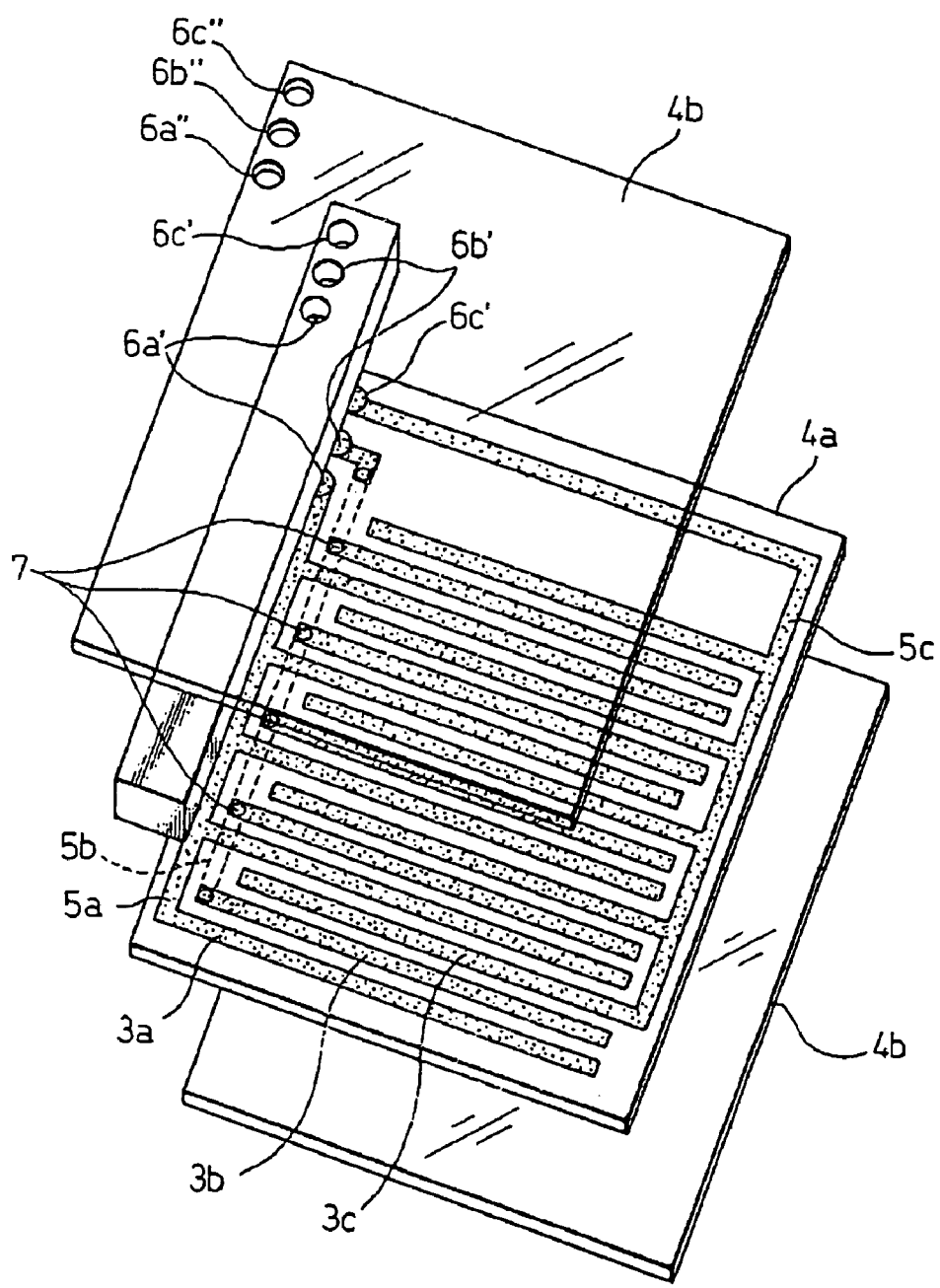
FIG. 1 is an exploded view of a spacer member-equipped film electrode Of an electrostatic motor according to a first embodiment of the present invention.

In the above fourth and fifth embodiments, as clear from a comparison of FIG. 1 and FIG. 13, since the power feed path 5c is not arranged on the surface where the different phase electrode elements 3 are provided in parallel (effective drive surface), it is advantageous that the different phase electrode elements 3 can be lengthened and that the effective drive surface can be made larger than in the first to third embodiments.

Figure 19:
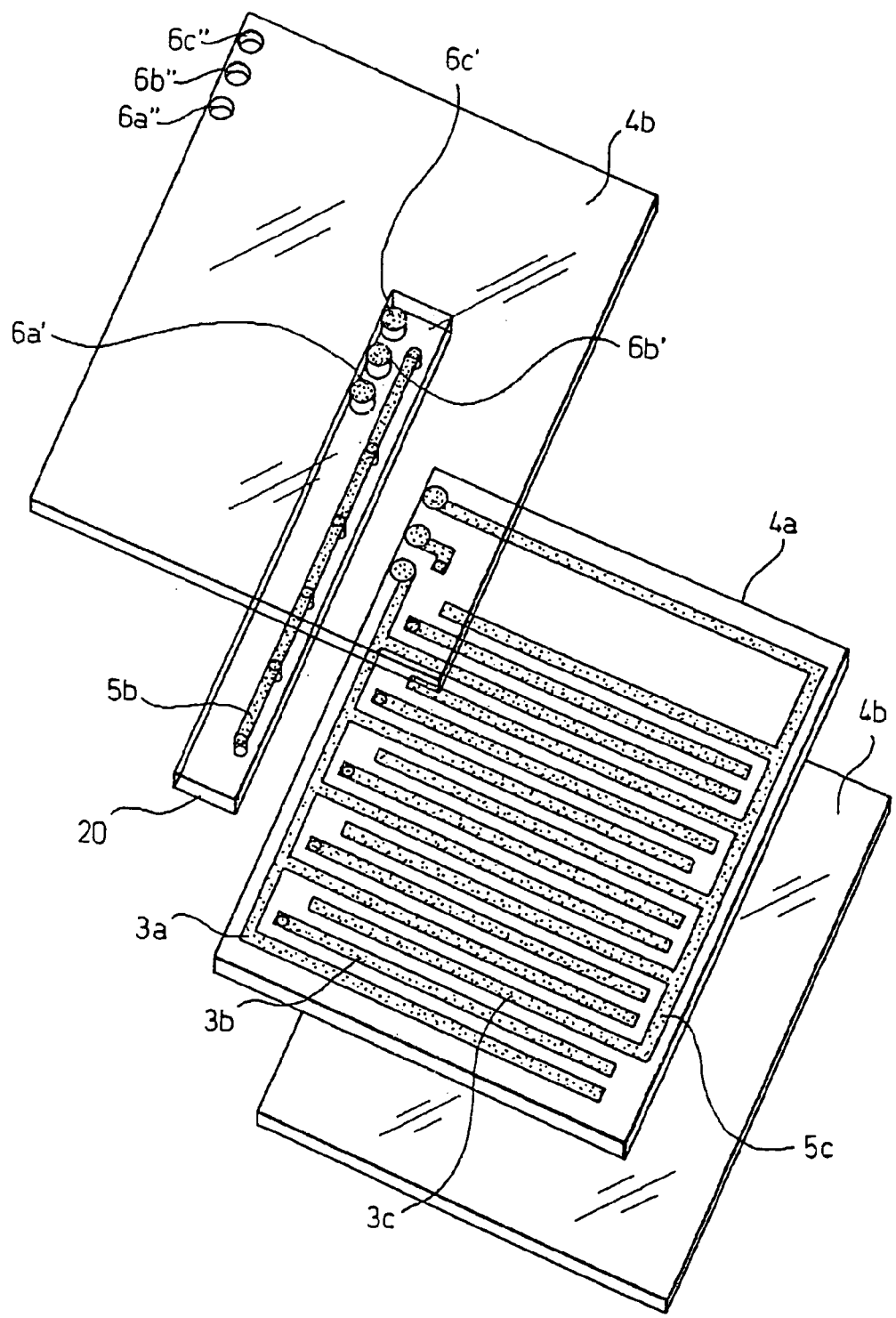
FIG. 19 is an exploded view of a spacer member-equipped film electrode of an electrostatic motor according to a sixth embodiment of the present invention.

FIG. 19 is an exploded view of a stator or slider film electrode 1 or 2 with a spacer member of an electrostatic motor according to a sixth embodiment of the present invention. This sixth embodiment differs from the above-mentioned first embodiment in the point that the power feed path 5b is provided not on the base film 4a but on a spacer member 20. The rest of the configuration is the same as the first embodiment. The power feed path 5b for feeding power to the electrode elements 3b is provided on one surface of the spacer member 20 and the other surface thereof is bonded to the base film 4a. As the rest of the configuration is the same as the first embodiment, it is not described here in detail.

While the present invention has been described with reference to specific embodiments shown in the accompanied drawings, these embodiments are only for explanatory and are not limitative. Therefore, the scope of the present invention is only restricted by the claims. The preferred embodiments of the present invention may be modified or changed in any way without departing from the scope of the claims.

What is claimed is:

1. An electrostatic motor comprising stator and slider film electrodes stacked with a gap, each having a base film on which electrode elements are provided and cover films, wherein each of said film electrodes is integrally provided with a step for securing said gap, wherein each of said film electrodes provided with said steps is formed by bonding a spacer member to said base film and covering the bonded base film and spacer member by said cover films.

2. The electrostatic motor according to claim 1, wherein said spacer member is provided with means for transmitting power in a thickness direction.

3. The electrostatic motor according to claim 2, wherein said spacer member is further provided with means for transmitting power in a direction other than the thickness direction.

4. The electrostatic motor according to claim 1, wherein each of said film electrodes provided with said steps is formed by integrally forming said base film and said step.

5. The electrostatic motor according to claim 1, wherein each of said film electrodes provided with said steps is formed by integrally forming said step and one of said cover films.

6. The electrostatic motor according to claim 1, wherein each of said film electrodes provided with said steps is formed by bonding a spacer member to said film electrode.

7. The electrostatic motor according to claim 6, wherein said spacer member is provided with means for transmitting power in a thickness direction.

8. The electrostatic motor according to claim 7, wherein said spacer member is further provided with means for transmitting power in a direction other than the thickness direction.

9. The electrostatic motor according to claim 1, wherein each of said film electrodes provided with said steps is formed by riveting or screwing a spacer member 1C to said film electrode.

10. The electrostatic motor according to claim 1, wherein said electrostatic motor is formed by stacking a plurality of electrostatic motor units each formed by stacking, with a gap, said stator film electrode provided with said step and said slider film electrode provided with said step.

11. An electrostatic motor comprising stator and slider film electrodes stacked with a gap, each having a base film on which electrode elements are provided and cover films, wherein each of said film electrodes is integrally provided with a step for securing said gap, wherein each of said film electrodes provided with said steps is formed by riveting or screwing a spacer member for forming said step to said base film on which said electrode elements are provided and covering said base film and said spacer member by said cover films.

* * * * *